(12) United States Patent
Aoyama

(10) Patent No.: US 8,720,355 B2
(45) Date of Patent: May 13, 2014

(54) WATER JET PROPULSION BOAT

(75) Inventor: Yusuke Aoyama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/305,830

(22) Filed: Nov. 29, 2011

(65) Prior Publication Data

US 2012/0067264 A1      Mar. 22, 2012

Related U.S. Application Data

(63) Continuation of application No. 11/399,277, filed on Apr. 6, 2006, now abandoned.

(30) Foreign Application Priority Data

Jan. 24, 2006   (JP) .................................. 2006-014593

(51) Int. Cl.
*B63B 19/00*       (2006.01)

(52) U.S. Cl.
USPC ...................... 114/55.53; 114/55.51; 114/343

(58) Field of Classification Search
USPC ........ 114/343, 364, 55.5, 55.51, 55.53, 55.57
See application file for complete search history.

(56) References Cited

U.S. PATENT DOCUMENTS

| | | | |
|---|---|---|---|
| 5,593,329 A * | 1/1997 | Kato .......................... | 114/55.51 |
| 5,894,810 A * | 4/1999 | Orr ............................... | 114/343 |
| 6,276,290 B1 * | 8/2001 | Yamada et al. ............ | 114/55.51 |
| 6,626,124 B2 * | 9/2003 | Nakajima et al. ............. | 114/343 |
| 6,923,134 B1 * | 8/2005 | Vrudny et al. ............. | 114/55.53 |
| 7,464,814 B2 * | 12/2008 | Carnevali ...................... | 206/320 |

OTHER PUBLICATIONS

Aoyama; "Water Jet Propulsion Boat"; U.S. Appl. No. 11/399,277, filed Apr. 6, 2006.

* cited by examiner

*Primary Examiner* — Lars A Olson
(74) *Attorney, Agent, or Firm* — Keating & Bennett, LLP

(57) ABSTRACT

A water jet propulsion boat has a water jet propulsion device in a body, and is propelled by the water jet propulsion device. An electric unit having a waterproof structure and being separate from the body can be removably disposed in a storage section without using any tools. The storage section is defined by a recess provided in the body and being open upward.

10 Claims, 28 Drawing Sheets

(a)

(b)

WATER JET PROPULSION BOAT

PRIORITY INFORMATION

This application claims priority to Japanese patent application Serial No. 2006-014593, filed on Jan. 24, 2006, the entire contents of which is hereby expressly incorporated by reference.

BACKGROUND OF THE INVENTIONS

1. Field of the Inventions

The present inventions relate to electrical units for watercraft.

2. Description of the Related Art

Water jet propulsion boats are conventionally used generally for recreation. Although small personal watercraft are often times operated at elevated speeds, these boats are also often used for touring and cruising at lower speeds. Some boats, including small jet-propelled watercraft also known as "personal watercraft," are equipped with audio units. For example, Japanese Patent Document JP-A-Hei 10-338191 discloses such a watercraft.

The audio unit of the JP-A-Hei 10-338191 reference includes an amplifier and speakers. The speakers are fixed on both side faces of the body of the boat. In particular, the speakers are fixed to footsteps of the body to prevent ingress of water through a part where the speaker is attached to the body, during running of the water jet propulsion boat. The footsteps are the parts of the boat where the rider places his/her feet. The amplifier is fixed to a place where the rider on the seat can easily operate the controls on the amplifier.

SUMMARY OF THE INVENTIONS

An aspect of at least one of the embodiments disclosed herein includes the realization that audio and other electrical systems that are installed integrally with the hull of a boat, such as the hull of a small personal watercraft, can be subjected to more vibration and splashing than the currently available marine audio systems can withstand. Further, when such a system needs to be serviced, the entire watercraft cannot be used because parts of the system that removed may leave large holes in the hull of the watercraft, leaving the watercraft unusable.

Thus, in accordance with at least one of the embodiments disclosed herein, a water jet propulsion boat can comprise a hull, a water jet propulsion device disposed in the hull and configured to propel the boat, and an electric unit having a waterproof structure and being separate from the hull. The electric unit can be configured to be connectable to and removable from a storage section without using any tools, the storage section being defined by a recess provided in the body and opening upwardly.

DETAILED DESCRIPTION OF THE PREFERRED EMBODIMENT

Figure 1:
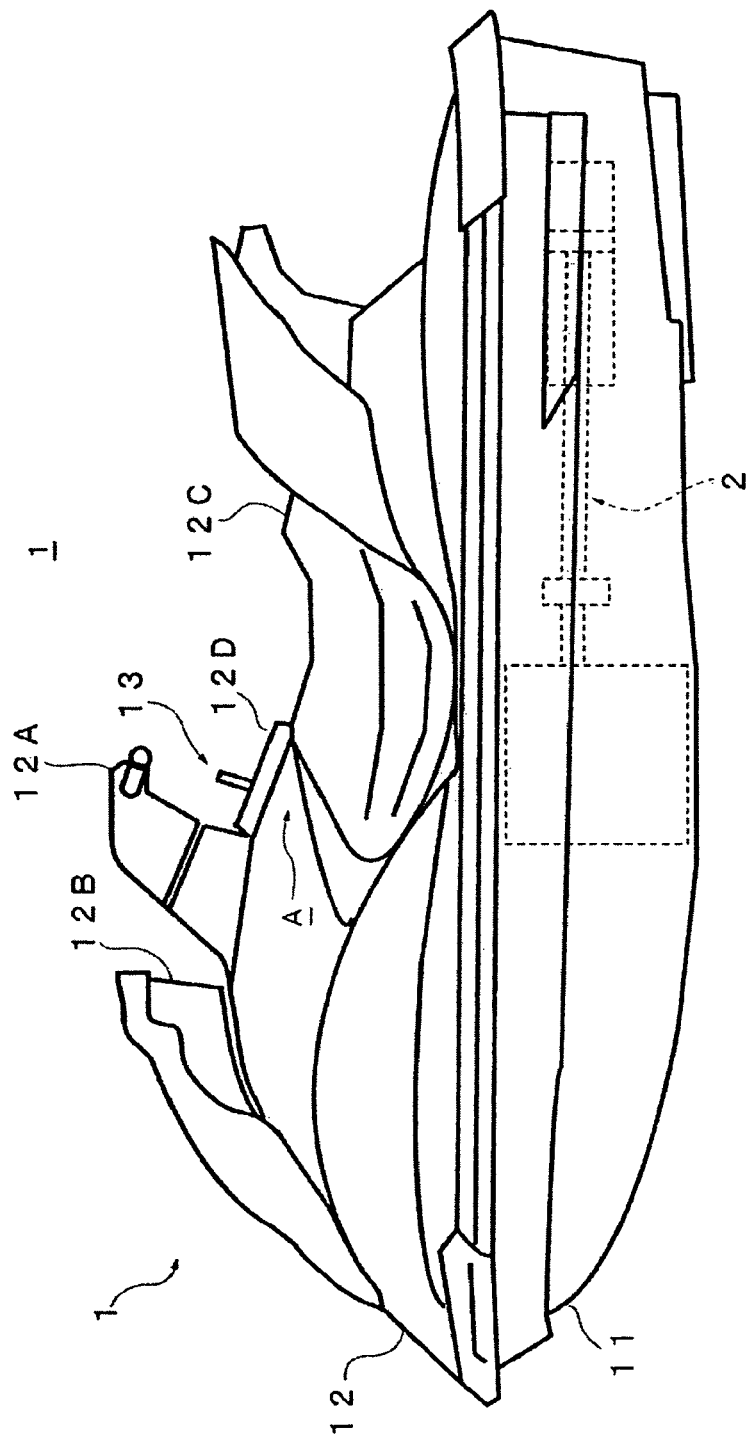
FIG. 1 is a schematic side elevational view of a water jet propulsion boat in accordance with an embodiment.

FIG. 1 is a side view of a water jet propulsion boat having an electronics unit according to an embodiment. The embodiments disclosed herein are described in the context of a personal watercraft because the embodiments disclosed herein have particular utility in this context. However, the embodiments and inventions herein can also be applied to other boats having other types of propulsion units as well as other types of vehicles.

The water jet propulsion boat of can include a body 1, which can be made up of a lower hull 11 and an upper deck 12, as shown in FIG. 1. In the body 1, there can be provided a water jet propulsion device 2 to propel the body 1, and the like. However, other types of propulsion systems can also be used.

The deck 12 can be raised upwardly at a central portion of the body 1. On the raised deck portion and on the forward end of the body, there can be provided steering handlebars 12A configured to be operated by a rider to change the direction along which the body 1 is propelled by the water jet propulsion device 2.

Rearview mirrors 12B can be provided in front of the steering handlebars 12A and on the front side of the deck 12. A seat 12C on which the rider is seated can be provided behind the steering handlebars 12A and at a central portion of the deck 12. Thus, the seat 12C can define a portion of the operator's area of the watercraft.

Figure 2:
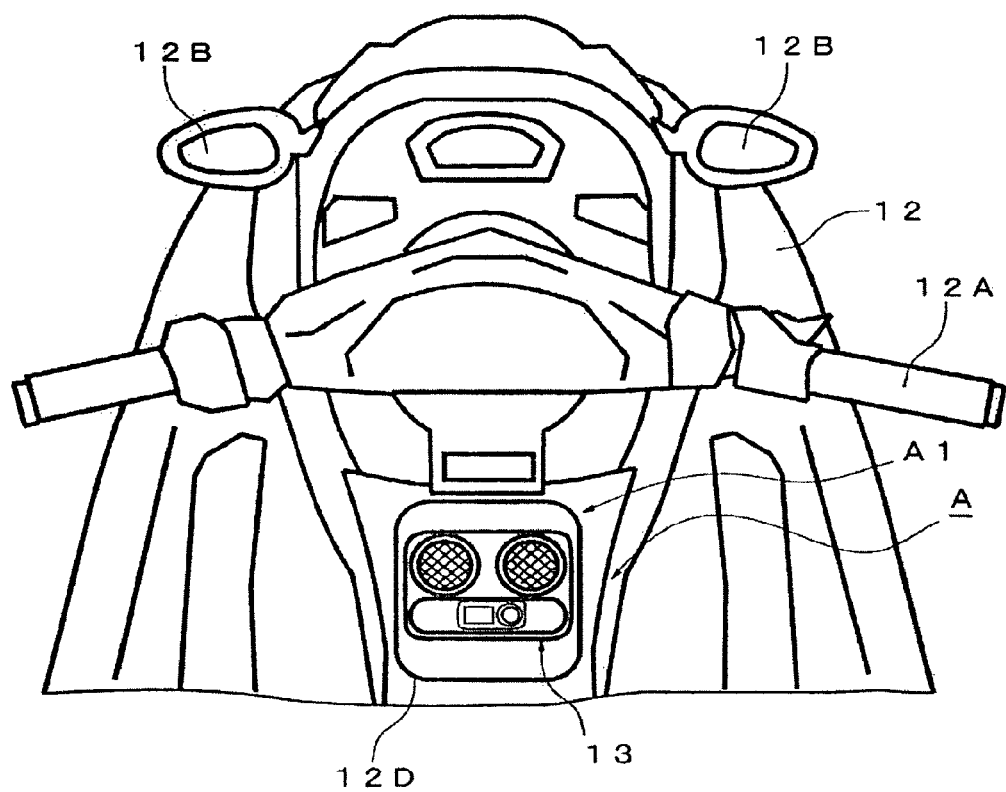
FIG. 2 is an enlarged plan view of an operator's area of the water jet propulsion boat having an audio unit storage box.
Figure 3:
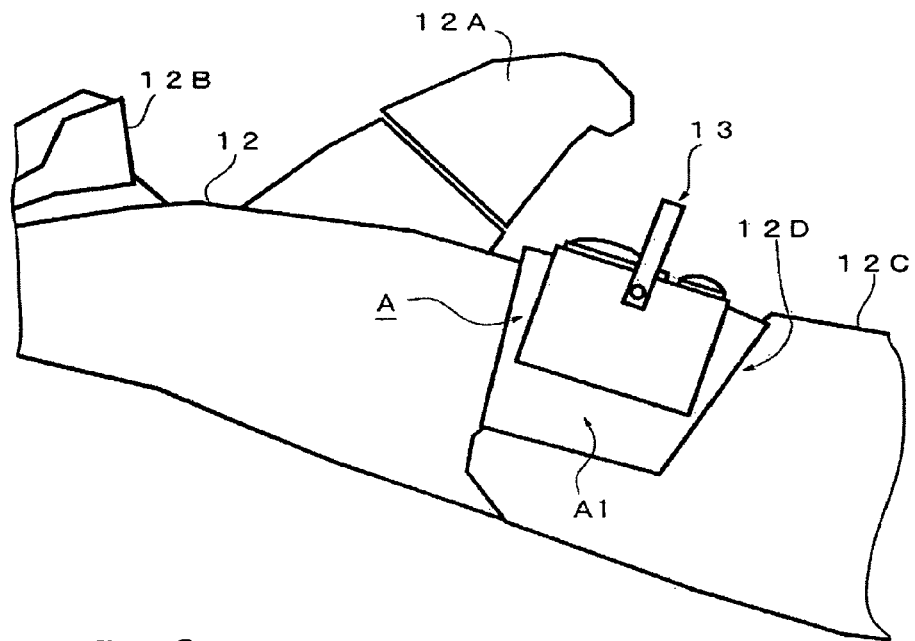
FIG. 3 is a partial sectional view of the operator's area, showing an enlarged cross section of the storage box.

As shown in FIGS. 2 and 3, at a part of the deck of the body 1, between the steering handlebars 12A and the seat 12C, there can be provided a storage section A, in which an electronics unit, such as, for example, but without limitation, an audio unit 13 can be disposed. Further advantages can be achieved by providing such an electronics or audio unit as an unit separate from the body 1 and configuring it so as to be removable without using any tools.

The space between the steering handlebars 12A and the seat 12C can be within easy reach of the operator, and thus the operator can easily operate the audio unit 13 or any other electronics unit disposed in such an area. As shown in FIGS. 4 through 7, the storage section A can be defined by a recess A1 provided in the body 1 and can be oriented to open upwardly. The storage section A can also serve as a storage box 12D for holding baggage and small articles, as specifically described below.

Figure 4:
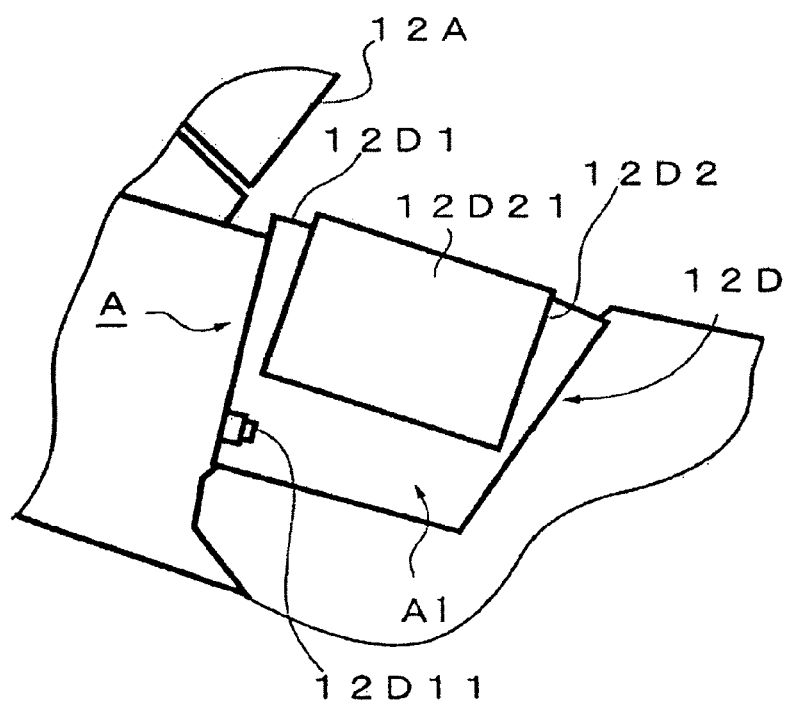
FIG. 4 is a further enlarged sectional view of the storage box.

As shown in FIG. 4, the storage box 12D can include an outside box body 12D1 and an attachment member 12D2 inside the outside box body 12D1. The outside box body 12D1 can be provided with a plug socket 12D11, or another device, configured to supply DC power to the audio unit 13.

The attachment member 12D2 can be provided below the top face of the outside box body 12D1, and the top face of the attachment member 12D2 can be formed with an opening. For example, a storage space 12D21 for the audio unit can be defined by the attachment member 12D2 and the storage space 12D21 forms the storage section A, defined by the recess A1 provided in the body 1 and being open upwardly.

The storage box 12D can be made by plastic molding or the like. In some embodiments, the storage box 12D can be provided as a glove compartment generally provided between the steering handlebars 12A and the seat 12C. However, the storage box 12D may be provided at other parts of the deck 12, instead of using the glove compartment for this purpose. The attachment member 12D2 may be in a box shape or may be formed to be supported with parts of the audio unit 13, such as the edges or faces thereof.

Figure 5:
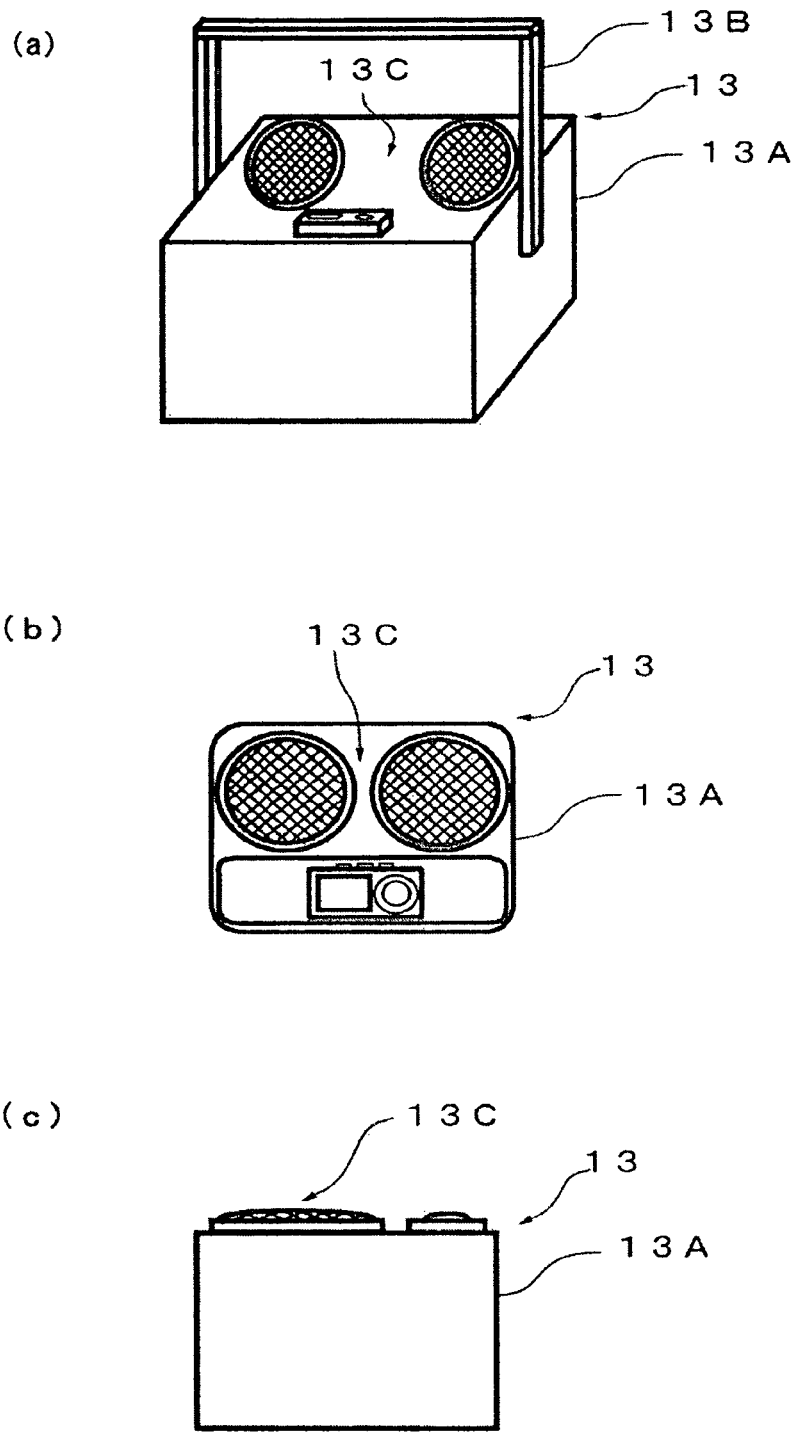
FIGS. 5(a), (b), and (c) show several views of an audio unit that can be used with the audio unit storage box shown in FIGS. 2-4.

The audio unit 13 can be configured to be removably mounted in the storage space 12D21 of the storage box 12D. The audio unit 13 can be an electric unit having an electronic circuit and the like, and can includes a casing 13A, an arm 13B, and an audio device 13C, as shown in FIG. 5. The arm 13B is not shown in FIGS. 2, 5(b), and 5(c).

Figure 6:
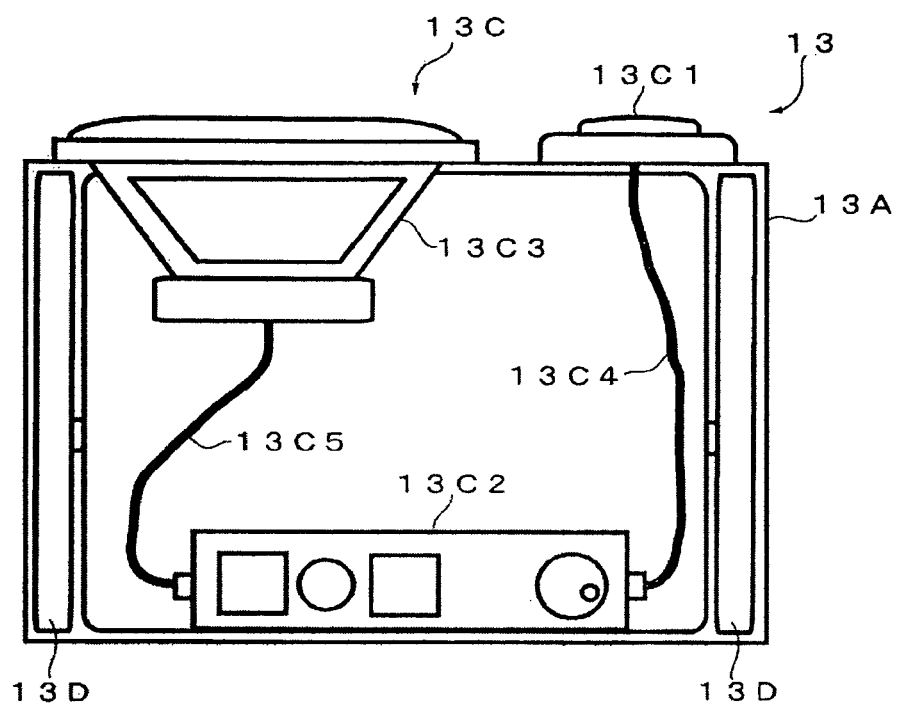
FIG. 6 is a sectional view of the audio unit.

The casing 13A can be a three-dimensional storage box designed to be received in the storage space 12D21 of the storage box 12D. As shown in FIG. 6, a lining material 13D can be attached to the entire inner wall of the casing 13A. The lining material 13D, in some embodiments, can be a soundproof material configured to absorb sounds from the audio device 13C to improve sound quality. In other embodiments, the material 13D can be a vibration-proof material configured to prevent resonance of the casing 13A due to sounds from the audio device 13C, to improve sound quality. In some embodiments, the audio device 13C can be provided in the casing 13A with the inner wall thereof being covered with the lining material 13D.

The audio device 13C can include an audio player 13C1, an amplifier 13C2, and a speaker 13C3, and/or other devices. The player 13C1 can be a reproduction device provided on the top outer face of the casing 13A and operated by the rider. The player 13C1 can be for example, but without limitation, an MP3 player, an MD (minidisk) player, a CD (compact disk) player, or any other type of audio or video player can be used. The player 13C1 can also include a radio receiver. The player 13C1 can be mounted in a waterproof pack to prevent ingress of water. The player 13C1 can be configured to output a lower power reproduction signal or a reception signal such that headphones or the like can be driven directly by the player 13C1.

The amplifier 13C2 can be provided on the bottom inner face of the casing 13A. The amplifier 13C2 is configured to receive the reproduction signal or the reception signal (which can be a lower power signal as noted above) from the player 13C1 via a cable 13C4. In place of using the cable 13C4, the player 13C1 can have a battery disposed therein and wireless communication device or the like can be used to transmit the reproduction signal or the reception signal from the player 13C1 to the amplifier 13C2.

Figure 7:
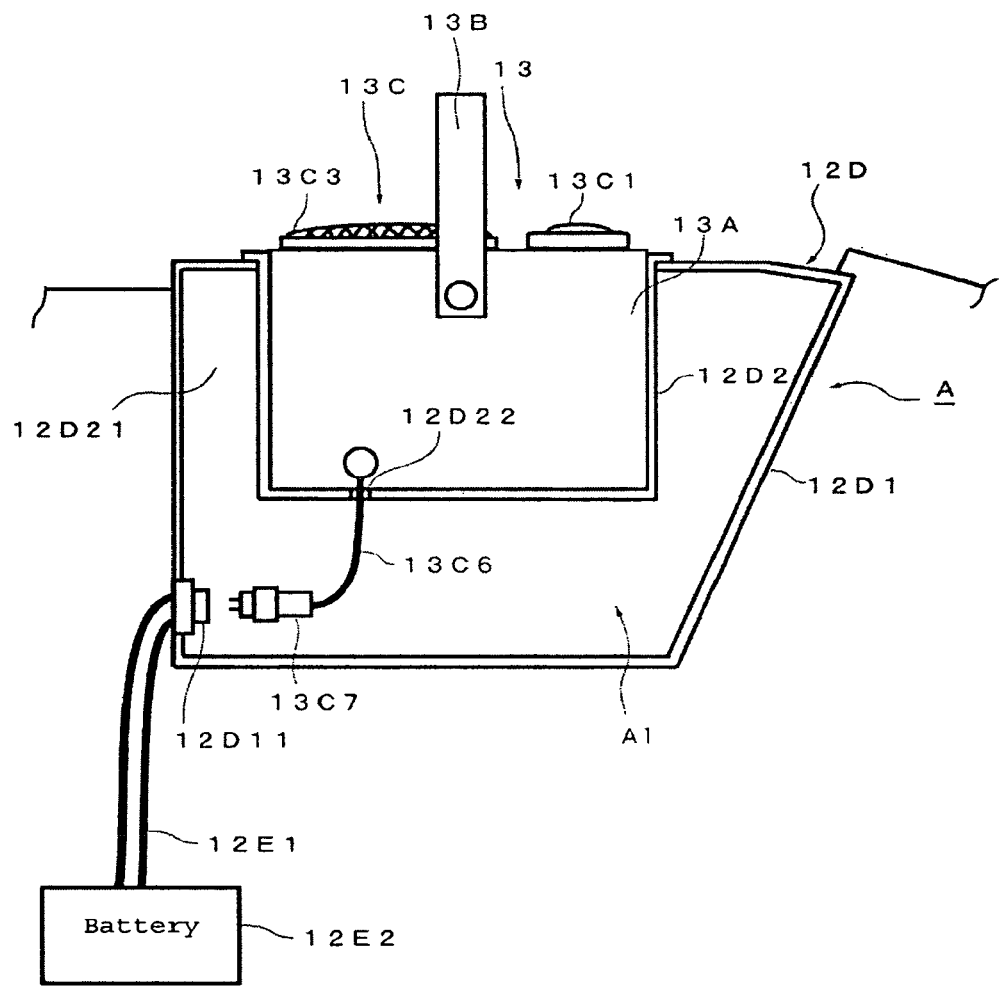
FIG. 7 shows a cross section of a storage section, in which the audio unit is removably disposed.

In some embodiments, the amplifier 13C2 can be connected to a power supply cable 13C6 shown in FIG. 7. The power supply cable 13C6 can be inserted through a cable hole 12D22 formed in the attachment member 12D2 and attached to the amplifier 13C2.

The opposite end of the power supply cable 13C6 can be fitted with a plug 13C7 that can be fitted in the plug socket 12D11 of the storage box 12D. The amplifier 13C2 can be operated with the power supplied via the power supply cable 13C6 to the plug 13C7. In operation, the amplifier 13C2 amplifies the lower power reproduction signal or reception signal and outputs the reproduction signal or the reception signal at a power level appropriate for driving the speaker at a desired volume.

The speaker 13C3 can be provided on the top inner face of the casing 13A. The speaker 13C3 is configured to receive the amplified reproduction signal or reception signal via a cable 13C5 and outputs audible sounds. The audio unit 13 can be waterproofed. Additionally, the audio unit 13 can be configured to have sufficient buoyancy to float on water. Therefore, in case the operator accidentally drops the audio unit 13 into water when mounting or removing the audio unit on water, the audio unit 13 can float and thus be readily retrievable.

During operation, a rider who uses this water jet propulsion boat can grip the arm 13B of the audio unit 13 and can then place the unit in the storage space 12D21 of the storage box 12D. In this case, the rider inserts the plug 13C7 of the audio unit 13 into the plug socket 12D11 of the storage box 12D. The plug socket 12D11 can be connected to a battery 12E2, mounted on the body 1, via a power supply cable 12E1. The audio device 13C of the audio unit 13 thus becomes ready for use.

Thereafter, as the rider operates the player 13C1 of the audio unit 13, the player 13C1 outputs the lower power reproduction signal the amplifier 13C2, which in turn amplifies the reproduction signal or the reception signal. The amplifier 13C2 then outputs the amplified signal to the speaker 13C3. Thus, the rider can enjoy music and radio. Since the audio unit 13 can be positioned in front of the rider, the audio unit 13 can also be easily operated by the operator.

After the audio unit 13 is used, or when the audio unit 13 is not used, the rider can remove the audio unit 13 from the storage box 12D to keep the audio unit 13 in a dry place. For example, when the audio unit 13 is left as it is in the storage box, the service life of the audio unit 13 can be reduced due to moisture or the like. On the other hand, if the audio unit 13 is kept in a dry place, reduction in the service life of the audio unit 13 can be prevented.

Additionally, an operator may wish to remove the audio unit 13 when the operator intends to operate the water jet propulsion boat in rough water. Thus, the operator may remove the audio unit 13, thereby avoiding damage that might have resulted from vibration caused by the operation in rough water. Further, in the case in which the audio unit 13 is subjected to maintenance or replacement, since the audio unit 13 is removable from the body 1, the water jet propulsion boat can be used even during servicing of the audio unit 13. When the audio unit 13 is not mounted, the storage space can be used as the storage box 12D, thereby maximizing the limited space of the water jet propulsion boat. Additionally, in embodiments where the storage box 12D is substantially sealed, water cannot enter the hull through the void created by the removal of the audio unit 13.

Since the audio unit 13 is removably disposed in the storage section A, provided in the body 1, without using any tools, removal work of the audio unit 13 can be easily and quickly carried out. The above-described embodiments of the storage box 12D allows the audio unit 13 to be removably disposed therein without using any tools, e.g., the audio unit 13 can be simply inserted into the opening of the storage box 12D. However, in some embodiments, the audio unit 13 can be provided with fixing means to be locked/unlocked by hand, such as for example, but without limitation, a spring-loaded latch.

The storage section A can also serve as the storage box 12D for holding baggage and small articles, and the audio unit 13 can be mounted in the opening of the storage box 12D. In some embodiments, the audio unit 13 can be mounted via the attachment member 12D2 or directly. Further, in the case in which the water jet propulsion boat includes a storage box such as the storage box 12D, the audio unit 13 can be mounted via a dedicated attachment member.

Figure 8:
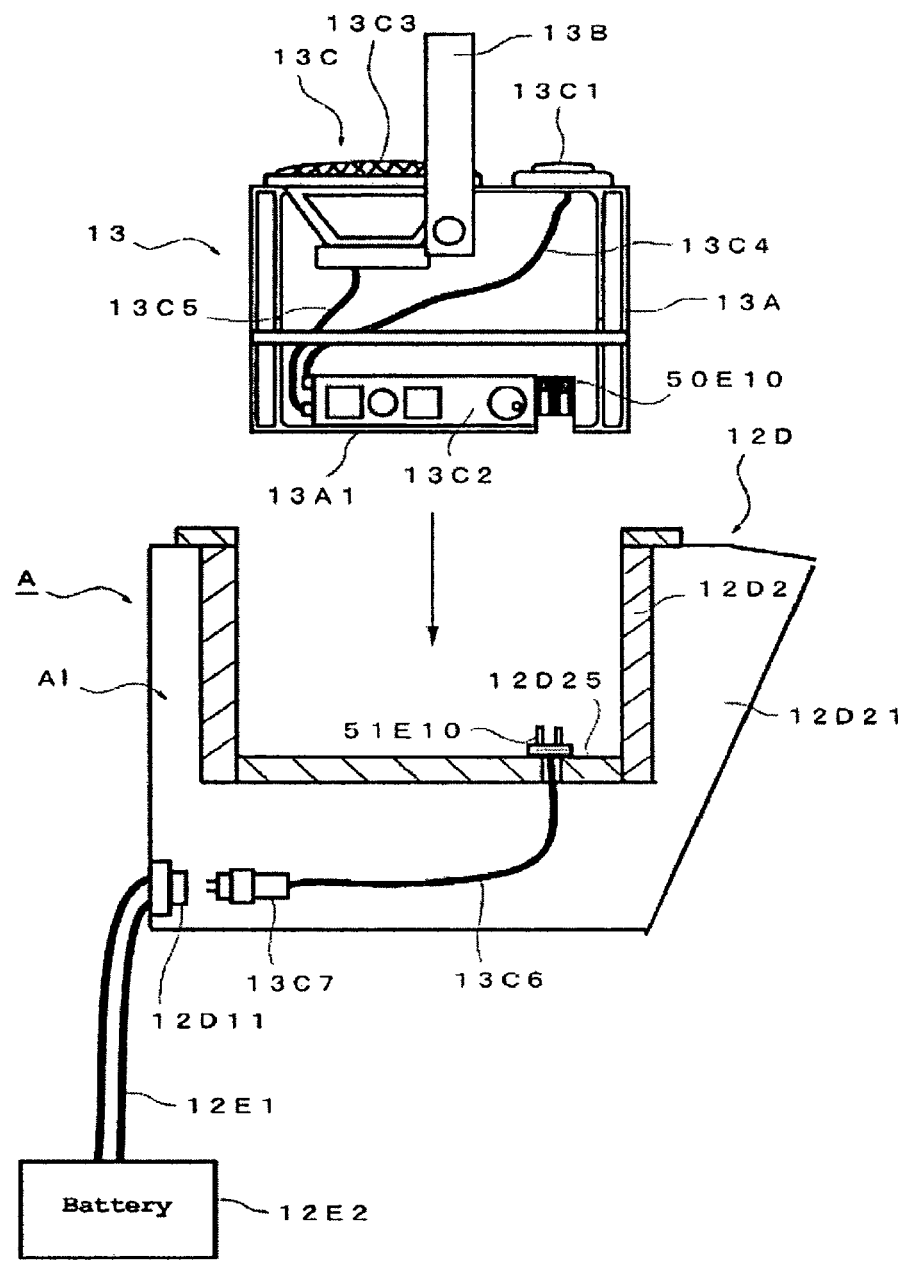
FIG. 8 is a schematic exploded and partial sectional view of a modification of the audio unit and storage box.
Figure 9:
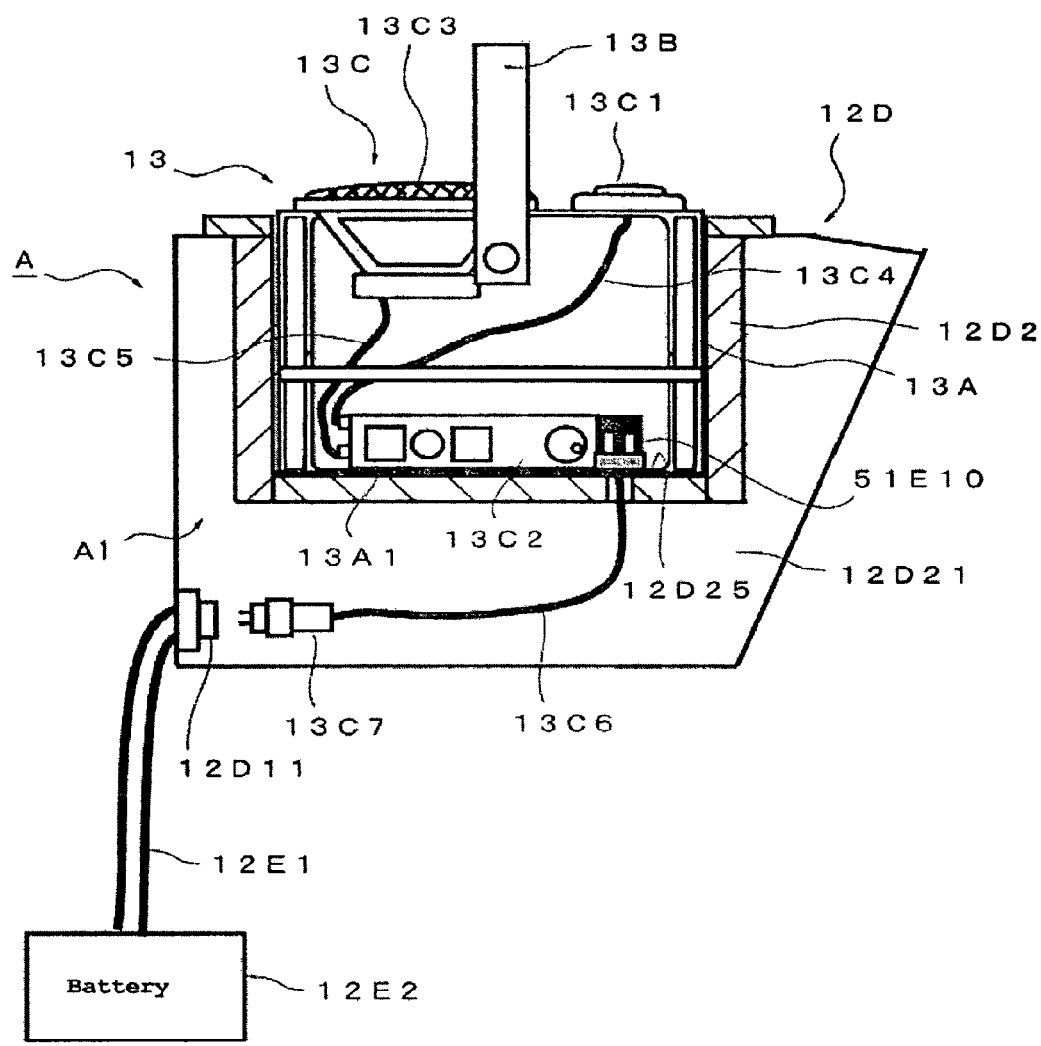
FIG. 9 is a schematic and partial sectional view of the audio unit and storage box of FIG. 8.

The modification of the audio unit 13 illustrated in FIGS. 8 and 9 includes some components that are the same as some of the embodiments of the audio unit 13 described above and thus it has been identified with the same reference numeral 13. In the embodiments of FIGS. 8 and 9, the audio unit 13 can, at a bottom part 13A1 of the audio unit 13, include a power supply connector 50E10. In some embodiments, the power supply connector 50E10 can be configured to be connected to the amplifier 13C2.

The embodiments of the storage box 12D illustrated in FIGS. 8 and 9 can be also formed in the same manner as embodiments of the storage box 12D described above. However, in some embodiments, the storage box 12D can include a power supply connector 51E10 on the bottom inner part 12D25 of the attachment member 12D2 attached to the storage box 12D. The power supply connector 51E10 can be configured to be connected to the power supply cable 13C6.

When the attachment member 12D2 is attached to define the storage space 12D21 of the storage box 12D, the plug 13C7 of the power supply cable 13C6 can be inserted into the plug socket 12D11 of the storage box 12D. The plug socket 12D11 can be connected to the battery 12E2, mounted on the body 1, via the power supply cable 12E1.

The arm 13B of the audio unit 13 can be gripped by a user to place the unit in the internal space defined by the attachment member 12D2 of the storage box 12D. As such, the power supply connector 50E10 of the audio unit 13 and the power supply connector 51E10 of the attachment member 12D2 are connected to each other, so that the audio device 13C of the audio unit 13 becomes ready for use. As illustrated in FIGS. 8 and 9, the connectors 50E10, 51E10 are aligned with each other such that the act of placing the audio unit 13 into the internal space is sufficient to bring the connectors 50E10, 51E10 into electrical connection with each other.

In this manner, the power supply connector 50E10 can be provided on the audio unit side, and the power supply connector 51E10 can be provided on the storage section side. As the audio unit 13 is mounted in the internal space defined by the attachment member 12D2 of the storage box 12D, which also serves as the storage section A, the power supply connectors are connected to each other so that power can be supplied. This provides a more simple procedure for mounting the audio unit 13 because no time or effort is needed to separately connect a power supply cable to the audio unit 13.

Figure 10:
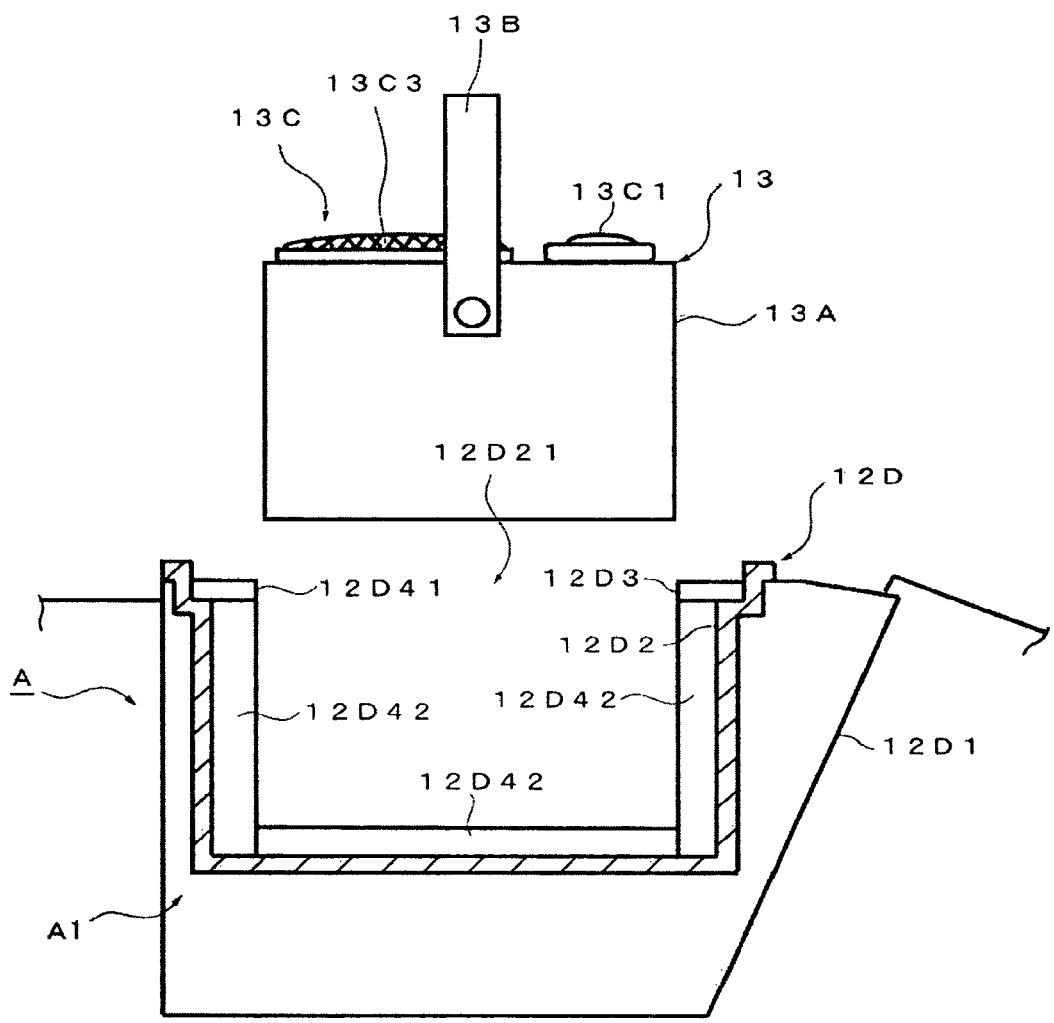
FIG. 10 is a schematic exploded and partial sectional view of another modification of the audio unit and storage box.

Another modification of the embodiments described above is illustrated in FIG. 10. In this modification, the storage box 12D has the larger attachment member 12D2, and can be formed with a step 12D3 at a part where the outside box body 12D1 and the attachment member 12D2 are joined to each other.

The step 12D3 can be fitted with a frame member 12D41 made of a vibration-proof or vibration-attenuating material. The side inner faces and the bottom inner face of the attachment member 12D2 can also be fitted with plate-like members 12D42 made of a vibration-proof material. The storage box 12D can be thus designed to have a vibration-proof structure by using the space created due to increased size of the attachment member 12D2. In these embodiments, the vibration-proof frame member 12D41 and the vibration-proof plate-like members 12D42 can be formed separately from each other, but may be formed integrally with each other.

In such embodiments, the storage box 12D can have a structure such that the entire inner wall of the attachment member defining the storage space 12D21 can be provided with the vibration-proof material so that the vibration-proof material can be provided between the audio unit 13 and the storage section A. This provides better prevention of resonance of the electric unit 13 due to sounds from the speaker 13C3 of the audio unit 13, thereby improving quality of the sounds coming from the speaker 13C3.

Figure 11:
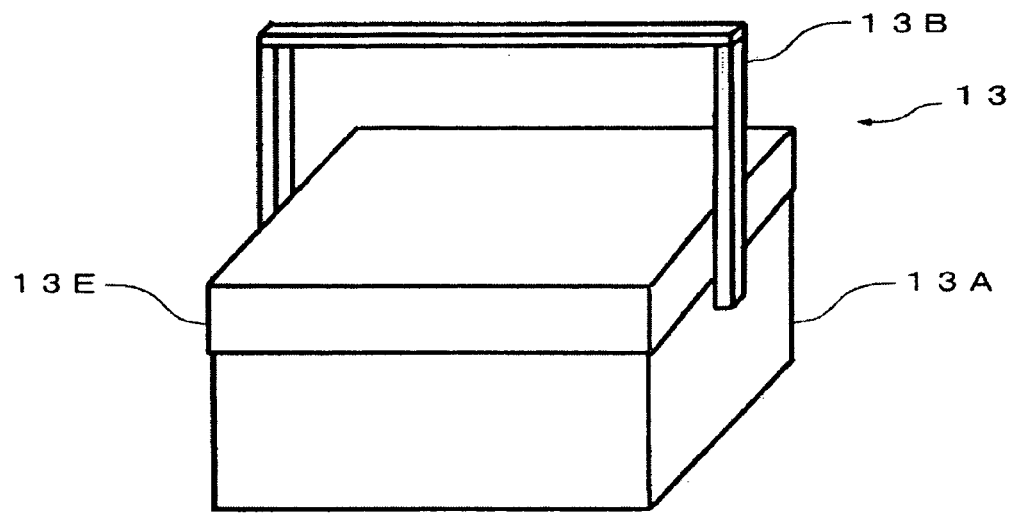
FIG. 11 is a perspective view of yet another modification of the audio unit.
Figure 12:
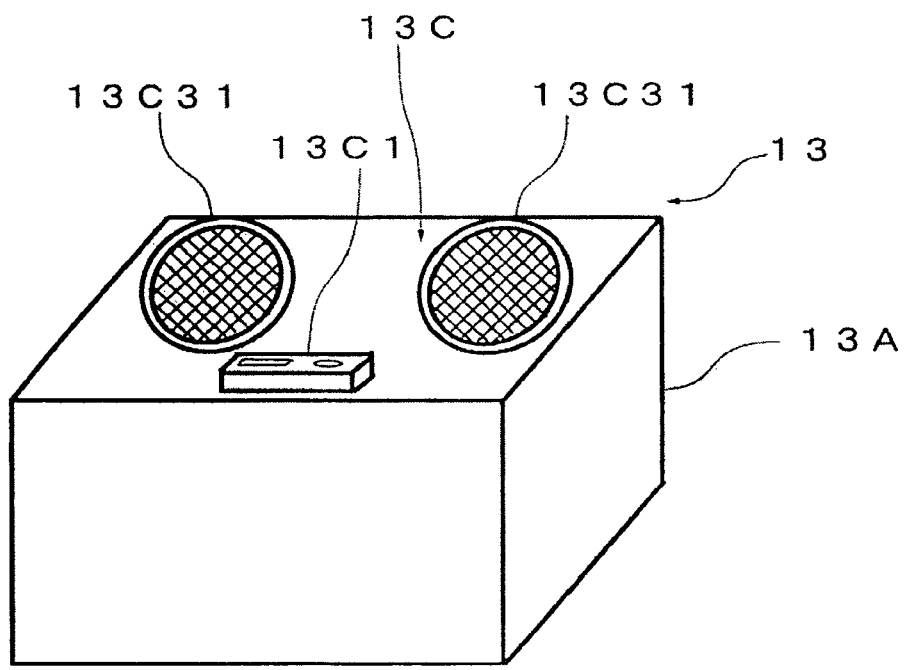
FIG. 12 is a perspective view of a modification of the audio unit of FIG. 12.

FIGS. 11 and 12 illustrate further modifications. In the audio unit shown in FIG. 11, a lid 13E can be provided for the casing 13A of the audio unit 13. The lid 13E can be configured to cover the player 13C 1 and speakers 13C31 to prevent ingress of water. When the rider does not use the audio device 13C, the casing 13A can be covered with the lid 13E, and thus water can be prevented from being sprayed onto the player 13C1 and the speakers 13C31.

Additionally, the audio unit 13 can be constructed such that the arm 13B can be removed from the casing 13A, as shown in FIG. 12. This can further simplify the construction and manufacture of the audio unit 13.

Figure 13:
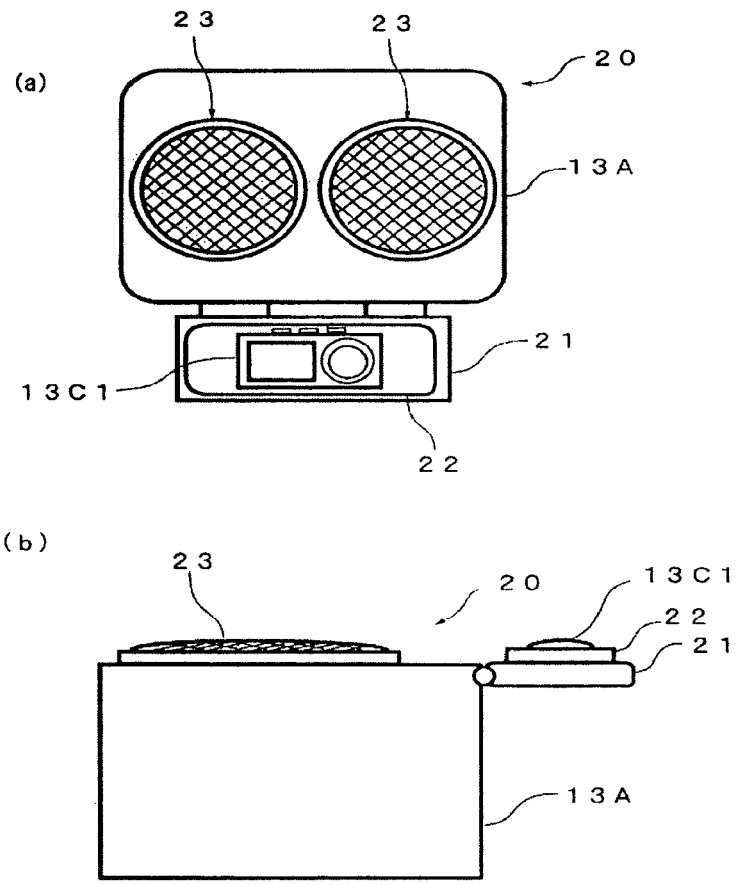
FIGS. 13(a) and (b) are top plan and side elevational views, respectively, of a further modification of the audio unit.
Figure 14:
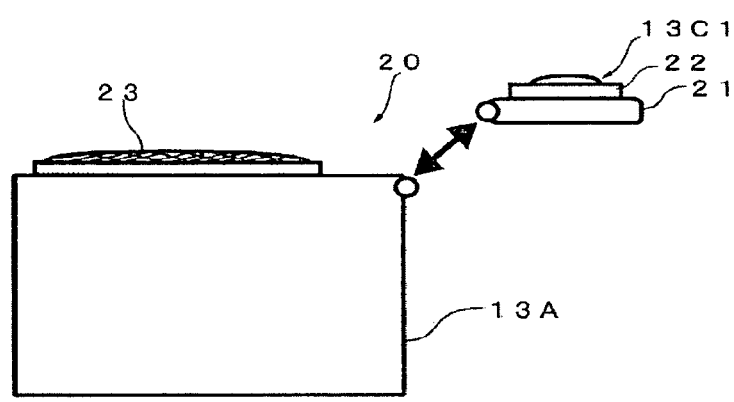
FIGS. 14(a) and (b) are a schematic exploded view of the audio unit of FIG. 13 and a plan view of the operator's area of the watercraft with the audio unit, respectively.
Figure 14:
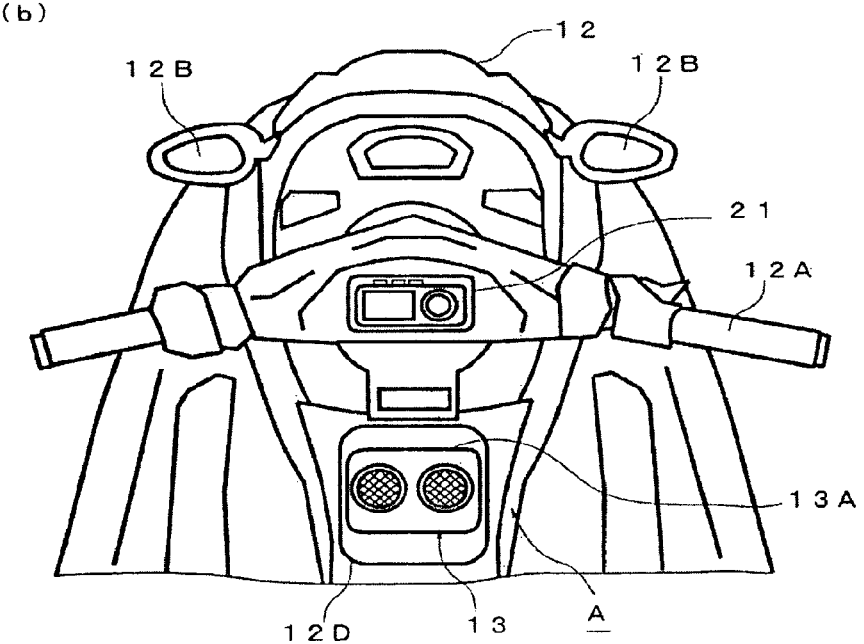

FIGS. 13 and 14 show further modifications of the audio unit 13 and the boat. In these figures, the modified audio unit is identified by the reference numeral 20. However, components of the audio unit 20 that are the same or similar to the corresponding components of the audio unit 13 are identified with the same or similar reference numerals.

In the audio unit 20 shown in FIG. 13, the player 13C1 of the audio unit 13 can be mounted to the casing 13A using a bracket 21. The bracket 21 can have a waterproof pack 22 to prevent ingress of water.

As the player 13C1 can be mounted in the waterproof pack 22, the player 13C1 can be attached to the bracket 21. The player 13C1 can also have a battery disposed therein, and can be operated with the power from the battery. Thus, even the player 13C1 that is not waterproofed can prevent ingress of water. Further, since the player 13C1 can be externally attached to the casing 13A, the area available for speakers 23 on the top face of the casing 13A can be increased.

Accordingly, in such embodiments, the large-diameter speakers 23 having a diameter larger than that of the speaker used in the embodiments of FIGS. 1-12. In FIG. 13, the large-diameter speaker 23 includes a waterproof cover for the speaker. The large-diameter speakers 23 improve the quality of reproduced sounds, so that the rider can enjoy music and radio with better sound quality.

With reference to FIG. 14(a), the bracket 21 with the player 13C1 mounted can be removably attached to the casing 13A. Also, the provision of a suction cup (not shown) or the like on the underside of the bracket 21 allows the player 13C1 to be disposed at any desired place on the deck 12.

For example, as shown in FIG. 14(b), it is possible to dispose the player on the central top face of the steering handlebars 12A of the water jet propulsion boat. In such embodiments, the player 13C1 and the amplifier 13C2 can be connected to each other by a wireless connection. Thus, it is even possible for the rider to wear the player 13C1 or to hold the player 13C1 to operate it. Thus, operability of the player 13C1 can be improved.

Further modifications are illustrated FIGS. 15-18. In these figures, the modified audio unit is identified by the reference numeral 30. However, components of the audio unit 30 that are the same or similar to the corresponding components of the audio units 13, 20 are identified with the same or similar reference numerals.

Figure 15:
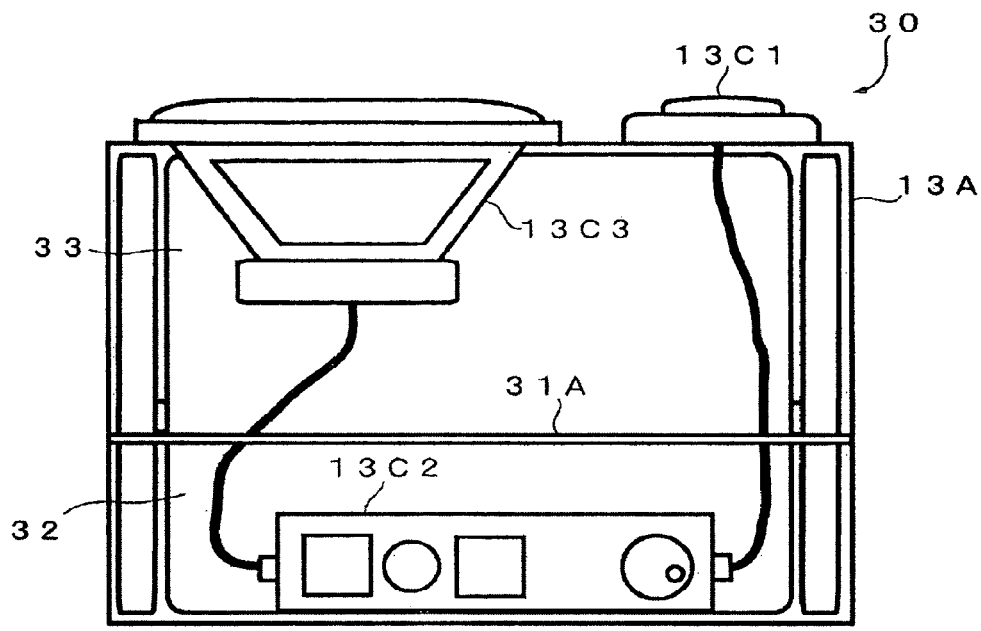
FIG. 15 is a schematic sectional view of yet another modification of the audio unit.
Figure 16:
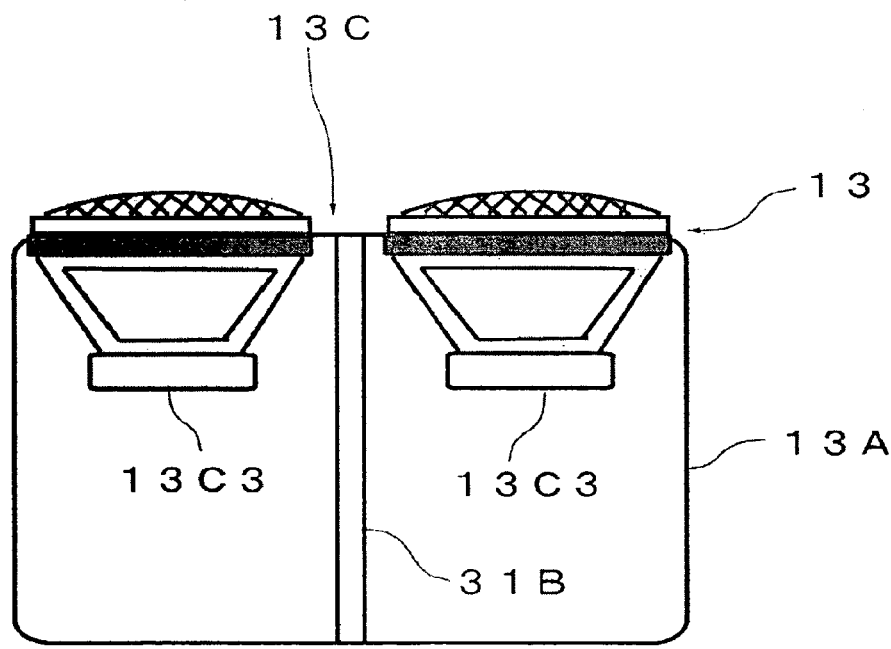
FIG. 16 is a schematic sectional view of another part of the audio unit of FIG. 15.
Figure 17:
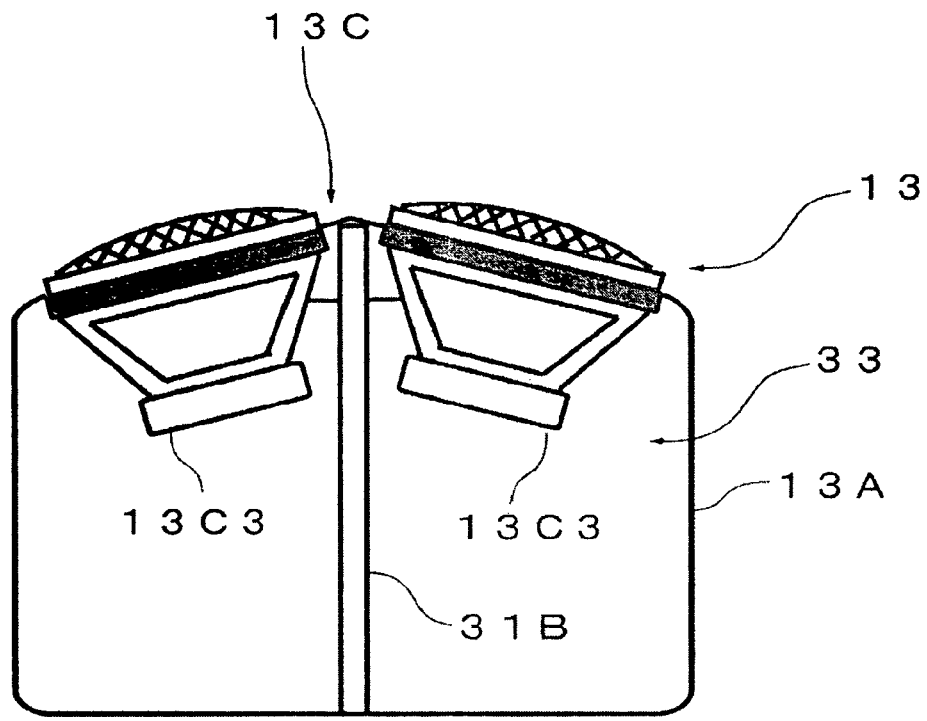
FIG. 17 is a schematic sectional, view of another part of the audio unit of FIG. 15.

An audio unit 30 shown in FIG. 15 has a partition 31A inside the casing 13A in Embodiments 1 through 5, depending on the level of sounds coming from the speaker 13C3. The partition 31A define an amplifier chamber 32 and a speaker chamber 33. As shown in FIG. 16, a partition 31 B can be provided to separate a speaker 13C3 for a right channel and a speaker 13C3 for a left channel. Optionally, the speakers 13C3 for the left and right channels can be inclined as shown in FIG. 17.

Figure 18:
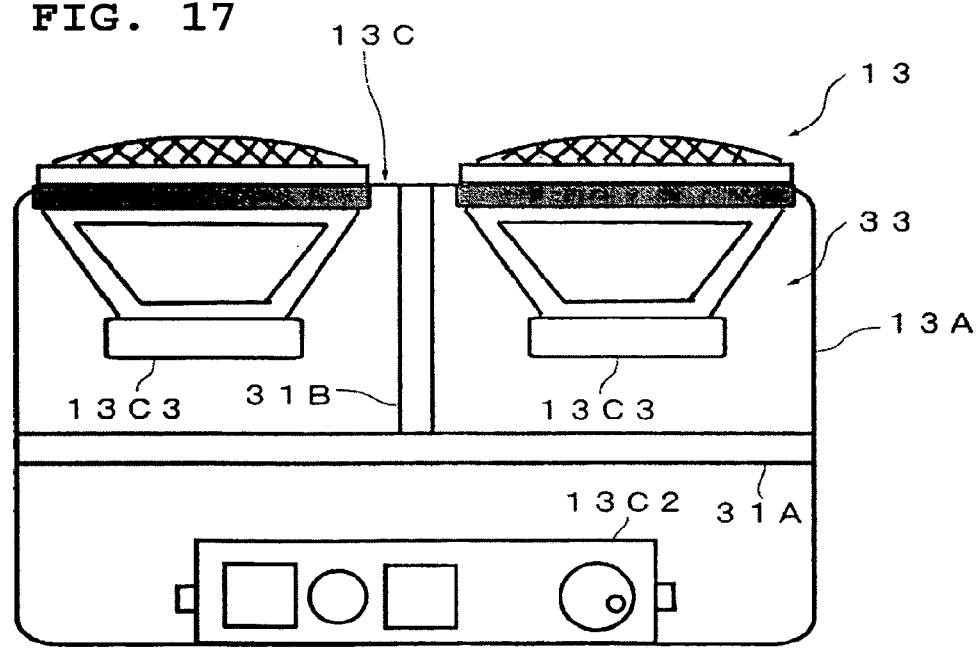
FIG. 18 is a schematic sectional view of yet another portion of the audio unit of FIG. 15.

Further, as shown in FIG. 18, the speaker chamber 33 can be separated from the amplifier chamber by the partition 31A and can further be separated by the partition 31B into two sections for left and right channels. Since the internal space of the casing 13A can be thus separated according to the level of respective sounds from the two speakers 13C3, interference between left and right channel sounds can be prevented, thereby outputting better quality sound.

Figure 19:
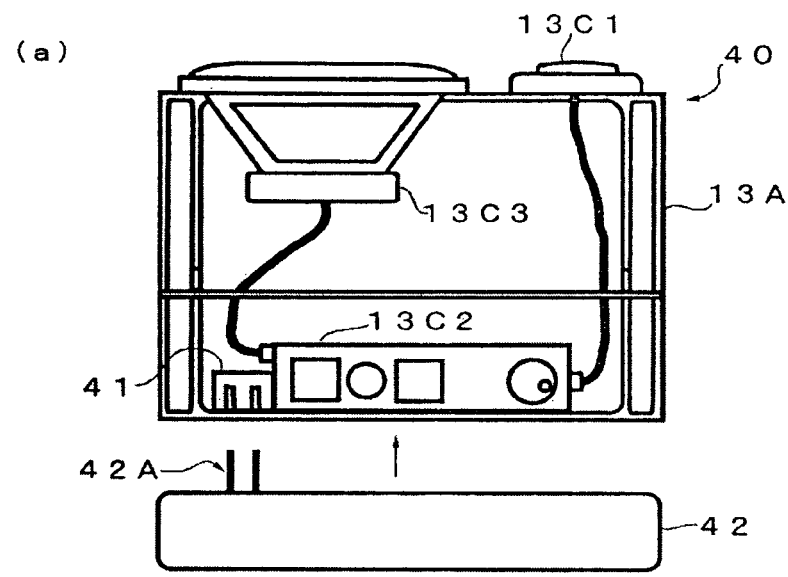
FIGS. 19(a) and (b) are a schematic exploded and partial sectional view of a further modification of the audio unit and a side elevational view of this modified audio unit.
Figure 19:
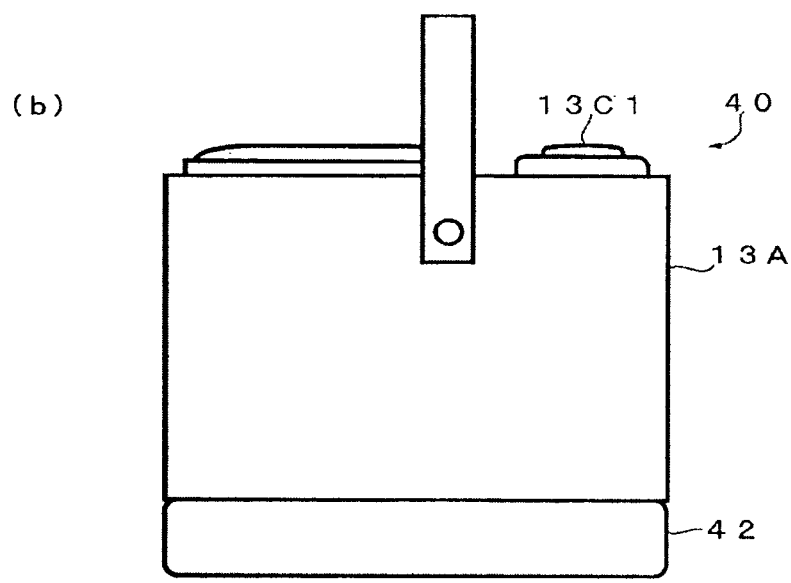

Additional optional modifications are illustrated FIG. 19. In this figure, the modified audio unit is identified by the reference numeral 40. However, components of the audio unit 40 that are the same or similar to the corresponding components of the audio units 13, 20, 30 are identified with the same or similar reference numerals.

The audio unit 40 shown in FIG. 19(a) has a plug socket 41 inside the casing for connection with a battery pack 42. The plug socket 41 can be connected to the amplifier 13C2. A plug 42A of a rechargeable battery pack 42 can be connected to the plug socket 41 from outside the casing 13A.

In such embodiments, when the rider uses the audio unit 40, the plug 42A of the battery pack 42 can be inserted into the plug socket 41, as shown in FIG. 19(b). This allows the battery pack 42 to supply power to the amplifier 13C2 via the plug 42A and the plug socket 41. As a result, even after the rider removes the audio unit 40 from the deck 12, the rider can use the audio unit 40.

Further, the use of the battery pack 42 requires no attachment procedure which is necessary for using the power supply cable 13C6 for wiring and the plug 13C7, provided on the casing 13A to supply power to the audio unit 40.

Figure 20:
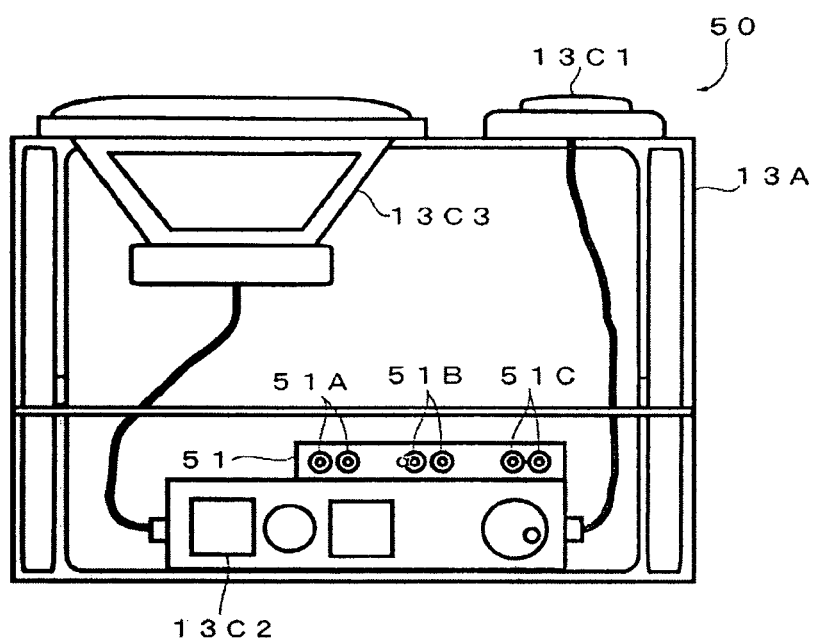
FIG. 20 is a schematic sectional view of another modification of the audio unit.
Figure 21:
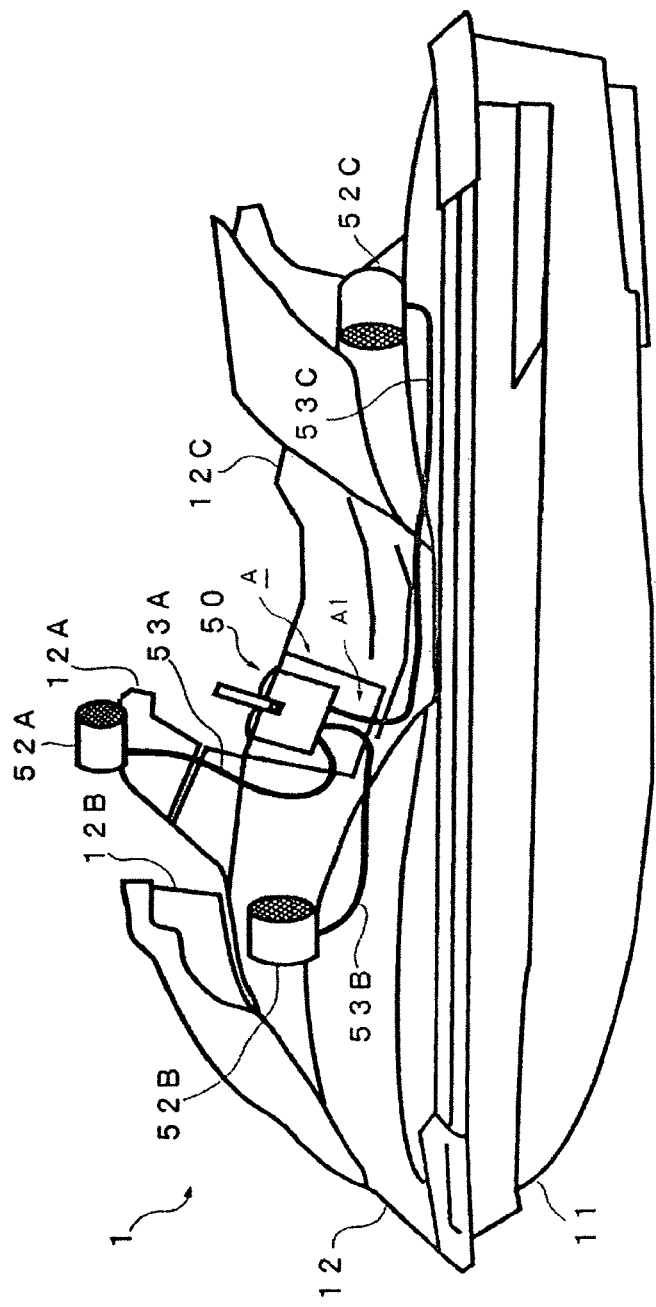
FIG. 21 is a side view of the water jet propulsion boat, showing the state in which speakers are attached.

Additional optional modifications are illustrated FIGS. 20 and 21. In these figures, the modified audio unit is identified by the reference numeral 50. However, components of the audio unit 50 that are the same or similar to the corresponding components of the audio units 13, 20, 30, 40 are identified with the same or similar reference numerals.

The audio unit 50 shown in FIG. 20 can be include an output expansion section 51 on the amplifier 13C2. The output expansion section 51 can be designed to add channels to drive more speakers 13C3.

As shown in FIG. 20, the amplifier 13C2 drives the speaker 13C3. The output expansion section 51 has channels 51A, 51B, and 51C, to which paired speakers can be respectively connected.

For example, as shown in FIG. 21, speakers 52A are disposed at opposite ends of the steering handlebars 12A, speakers 52B are disposed on the deck 12, outside of the rearview mirrors 12B, and speakers 52C are disposed on the deck 12, behind the seat 12C. The speaker 52A and the channel 51A are connected to each other via a cable 53A that is routed inside the deck 12. The speaker 52B and the channel 51B are connected to each other via a cable 53B that is routed inside the deck 12. The speaker 52C and the channel 51C are connected to each other via a cable 53C that is routed inside the deck 12.

When these three paired speakers 52A, 52B, and 52C are used, radio or music can be output louder compared to embodiments in which only the speaker 13C3 is used. Thus, when the water jet propulsion boat is running and even when sounds from the speaker are dulled by the wind from a forward direction, the rider can enjoy radio and music with sounds from the three paired speakers 52A, 52B, and 52C.

Figure 22:
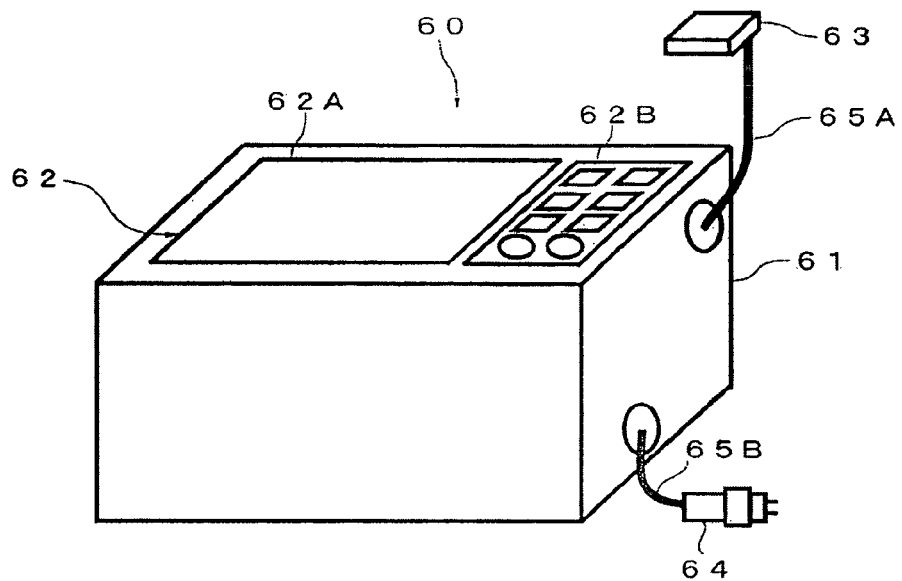
FIG. 22 is a perspective view of a GPS unit that can be used with the water jet propulsion boat.
Figure 23:
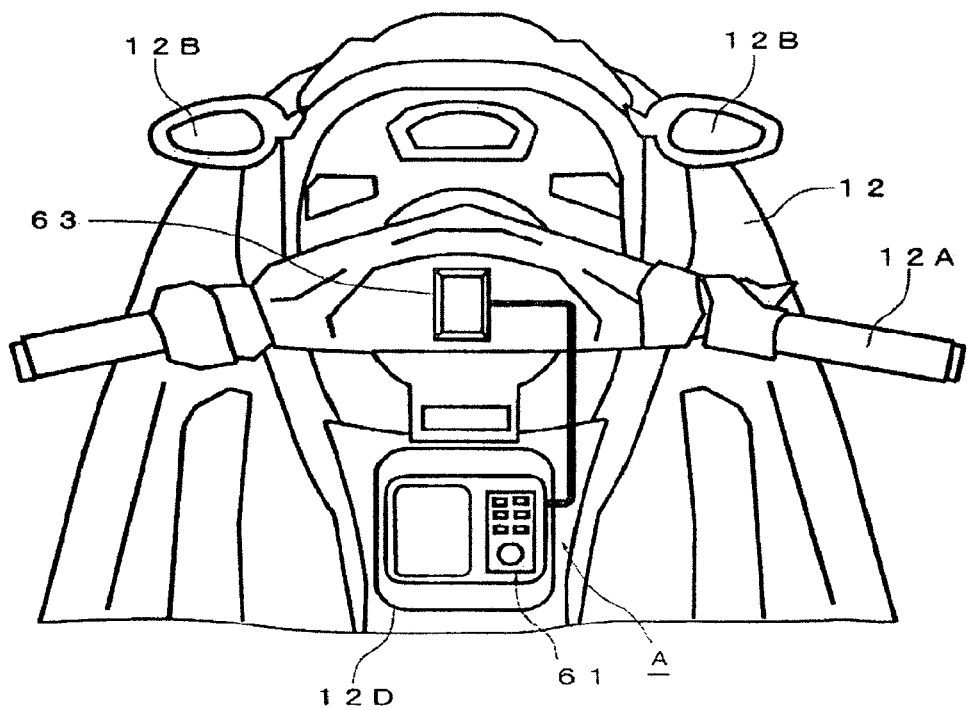
FIG. 23 is a plan view of the operator's area, with the GPS unit disposed therein.

Further optional modifications are illustrated FIGS. 22 and 23. In these figures, the modified unit is identified by the reference numeral 60. However, components of the unit 60 that are the same or similar to the corresponding components of the audio units 13, 20, 30, 40, 50 are identified with the same or similar reference numerals.

As shown in FIG. 22, a GPS (Global Positioning System) unit 60 can be used as an electric unit. The GPS unit 60 can include a casing 61, a GPS device 62, a GPS antenna 63, and a plug 64. The casing 61 can be in the same shape as the casings used in the audio units 13, 20, 30, 40, and 50. In the casing 61 of the unit 60, the GPS device 62 can be disposed.

The GPS device 62 can include an operation panel 62A configured to be operated for position determination, a display panel 62B to display the results of determination, and a main body (not shown) to carry out position determination in accordance with instructions given from the operation panel 62A. The main body of the GPS device 62 can be connected to the GPS antenna 63 via a cable 65A.

The GPS antenna 63 receives position data from a satellite and transmits this data to the main body of the GPS device 62. The GPS antenna 63 can be disposed at a central portion of the steering handlebars 12A, as shown in FIG. 23, however, other locations can also be used.

The main body of the GPS device 62 can be connected to the plug 64 via a cable 65B. The plug 64 can be inserted into the plug socket 12D11 of the storage box 12D. As power supply from the plug socket 12D11 can be applied to the main body of the GPS device 62 via the plug 64 and the cable 65B, the GPS device 62 can be brought into an operating state.

According to the water jet propulsion boat described above, it is possible for the rider to use the water jet propulsion boat according to his/her intended purpose such as touring, by removing and replacing the audio unit with the GPS unit 60. In this case, since the casing 61 of the GPS unit 60 has the same size as the casing 13A of the audio unit, such replacement can be easily accomplished.

Figure 24:
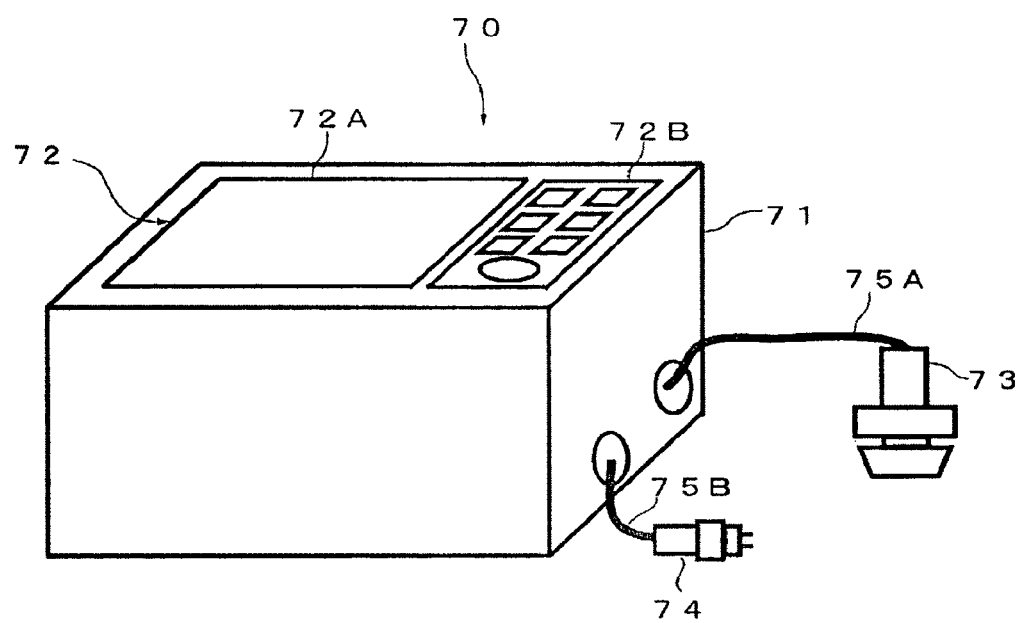
FIG. 24 is a perspective view of a fish-finding unit that can also be used with the water jet propulsion boat.
Figure 25:
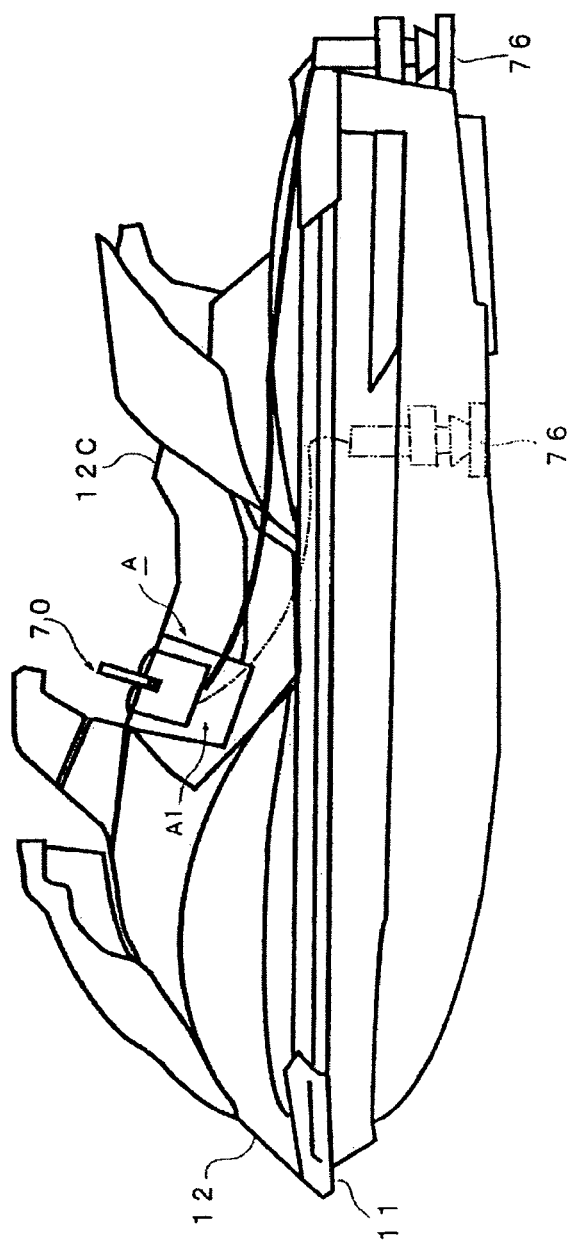
FIG. 25 is a side elevational view of the water jet propulsion boat, showing the fish-finding unit disposed therein.

Additional optional modifications are illustrated FIGS. 24 and 25. In these figures, the modified unit is identified by the reference numeral 70. However, components of the unit 70 that are the same or similar to the corresponding components of the audio units 13, 20, 30, 40, 50, 60 are identified with the same or similar reference numerals.

As shown in FIG. 24, a fish-finding unit 70 can be used as an electric unit. The fish-finding unit 70 can include a casing 71, a fish-finding device 72, a sensor 73, and a plug 74. The casing 71 can be in the same shape as the casing 13A described above with reference to FIGS. 1-23, and in the casing 71, the fish-finding device 72 can be disposed.

The fish-finding device 72 can include an operation panel 72A to be operated to locate fish, a display panel 72B to display the results of location, and a main body (not shown) to locate fish schools in accordance with instructions given from the operation panel 72A. The main body of the fish-finding device 72 can be connected to the sensor 73 via a cable 75A.

The sensor 73 can be configured to receive ultrasonic waves that it transmits into water and are reflected back towards itself. The sound wave signals can be transmitted to the main body of the fish-finding device 72.

The sensor 73 can be disposed on a flange 76 that can be provided at the rear end of the hull 11, as shown in FIG. 25. The sensor 73 can alternatively be provided inside the hull 11 below the seat 12C, namely, at the bottom of the body 1, as shown by broken lines in FIG. 25.

The main body of the fish-finding device 72 can be connected to the plug 74 via a cable 75B. The plug 74 can be inserted into the plug socket 12D11 of the storage box 12D. As power supply from the plug socket 12D11 can be applied to the main body of the fish-finding device 72 via the plug 74 and the cable 75B, the fish-finding device 72 can be brought into an operating state.

According to the water jet propulsion boat described above, it is possible for the rider to use the water jet propulsion boat according to his/her intended purpose such as fishing, by removing and replacing the audio unit, such as one of the audio units 13, 20, 30, 40 50, with the fish-finding unit 70. In this case, since the casing 71 of the fish-finding unit 70 has the same size and shape as the casing 13A of the audio unit, such replacement is easily accomplished.

Figure 26:
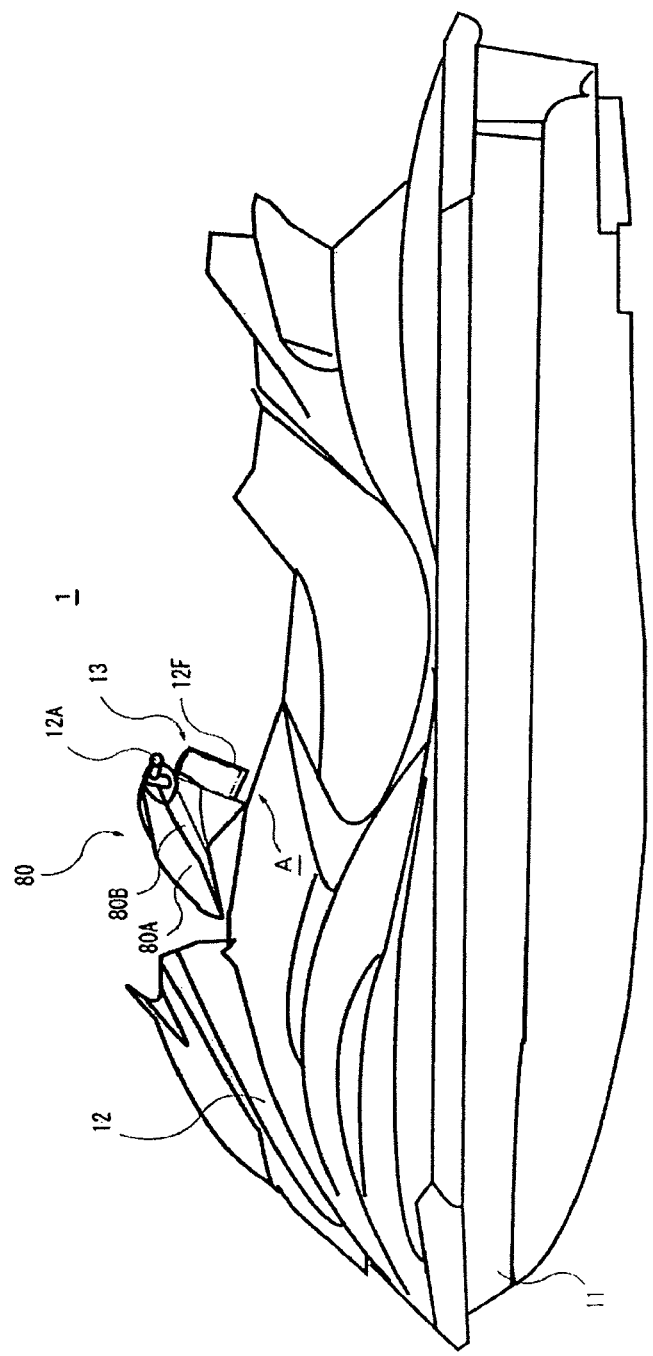
FIG. 26 is a side view of the water jet propulsion boat with an audio unit supported by the steering section of the watercraft.

Further optional modifications are illustrated FIGS. 26-30. In these figures, the water jet propulsion boat includes the body 1, and a steering section of the steering handlebars 12A can be covered with a steering cover 80 (FIG. 26).

Figure 27:
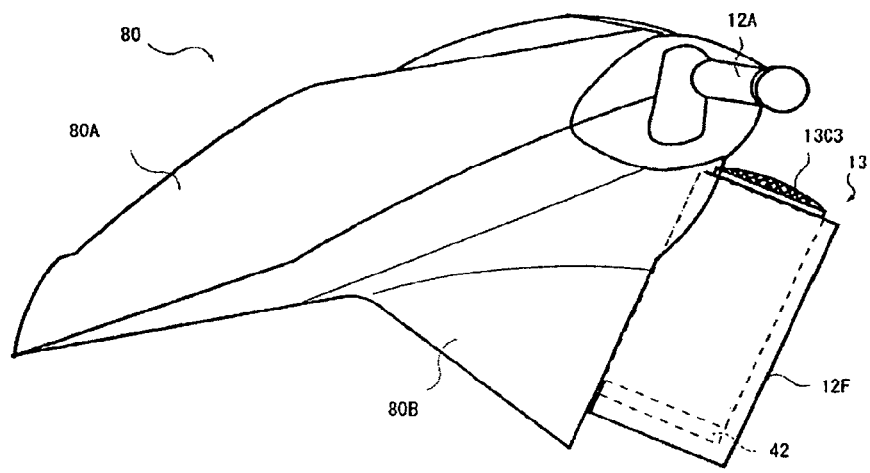
FIG. 27 is an enlarged side elevational view of the steering section.
Figure 28:
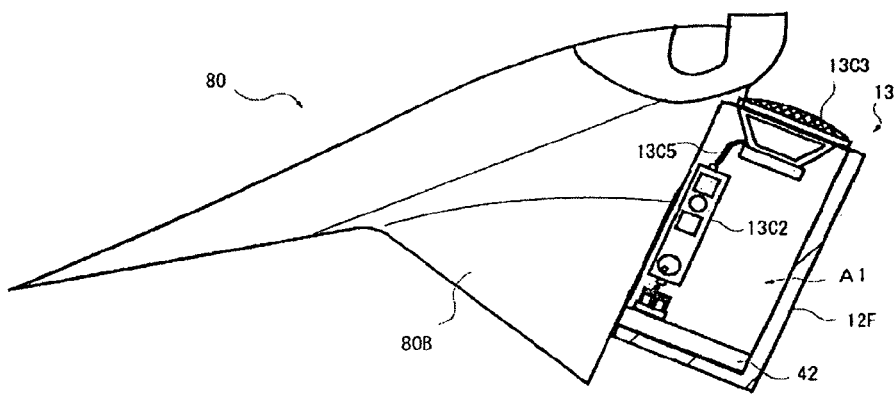
FIG. 28 is a side elevational and partial sectional view of the audio unit supported by the steering section.
Figure 29:
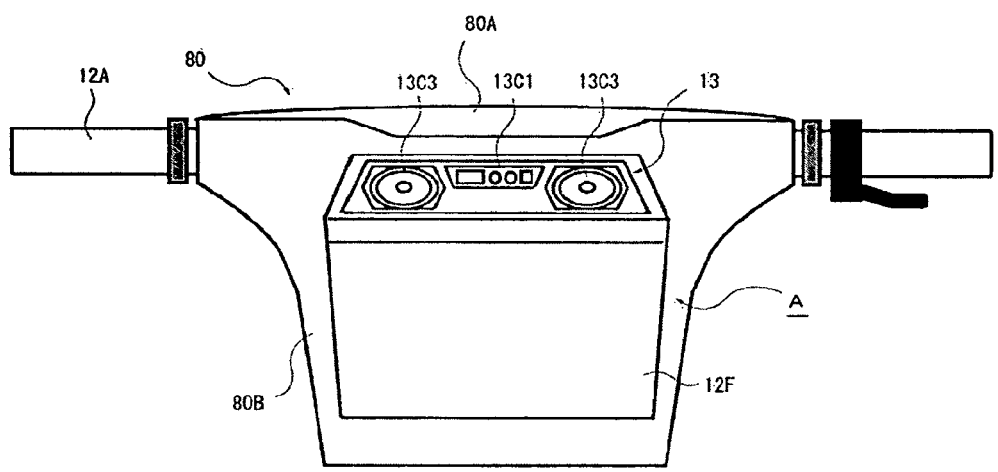
FIG. 29 is a rear elevational view, as seen from the operator side, of the steering section and the audio unit.

The steering cover 80 can have a two-piece structure and can be made up of a front cover half 80A and a rear cover half 80B, which are joined to each other to be mounted. However, other configurations can also be used. The rear cover half 80B can be formed integrally with a storage section A defined by a recess A1 that can be open upward, as shown in FIGS. 27 through 29. The storage section A can be defined by a storage box 12F, in which the audio unit 13, or other units or devices, can be removably disposed without using any tools.

The amplifier 13C2 (FIG. 28) can be provided on the side inner face of the casing 13A of the audio unit 13, and the player 13C1 and the speakers 13C3 can be provided on the top outer face of the casing 13A of the audio unit 13.

A bottom part of the audio unit 13 can be connected to the battery pack 42. As the audio unit 13 can be received in the storage box 12F of the rear cover half 80B, the audio device 13C of the audio unit 13 becomes ready for use. Both the audio unit 13 and the storage box 12F can be provided with power supply connectors, which are connected to each other as the audio unit 13 can be received in the storage box 12F of the rear cover half 80B.

In such manner, as the storage box 12F can be provided at a rear part of the steering handlebars 12A, the audio unit 13 mounted in the storage box 12F can be positioned at the rear part of the steering handlebars 12A, so that the audio unit 13 is not easily sprayed with water. Further, the audio unit 13 can output sounds, from the speakers 13C3 on the top outer face of the casing, which is not affected by the wind from a forward direction.

Figure 30:
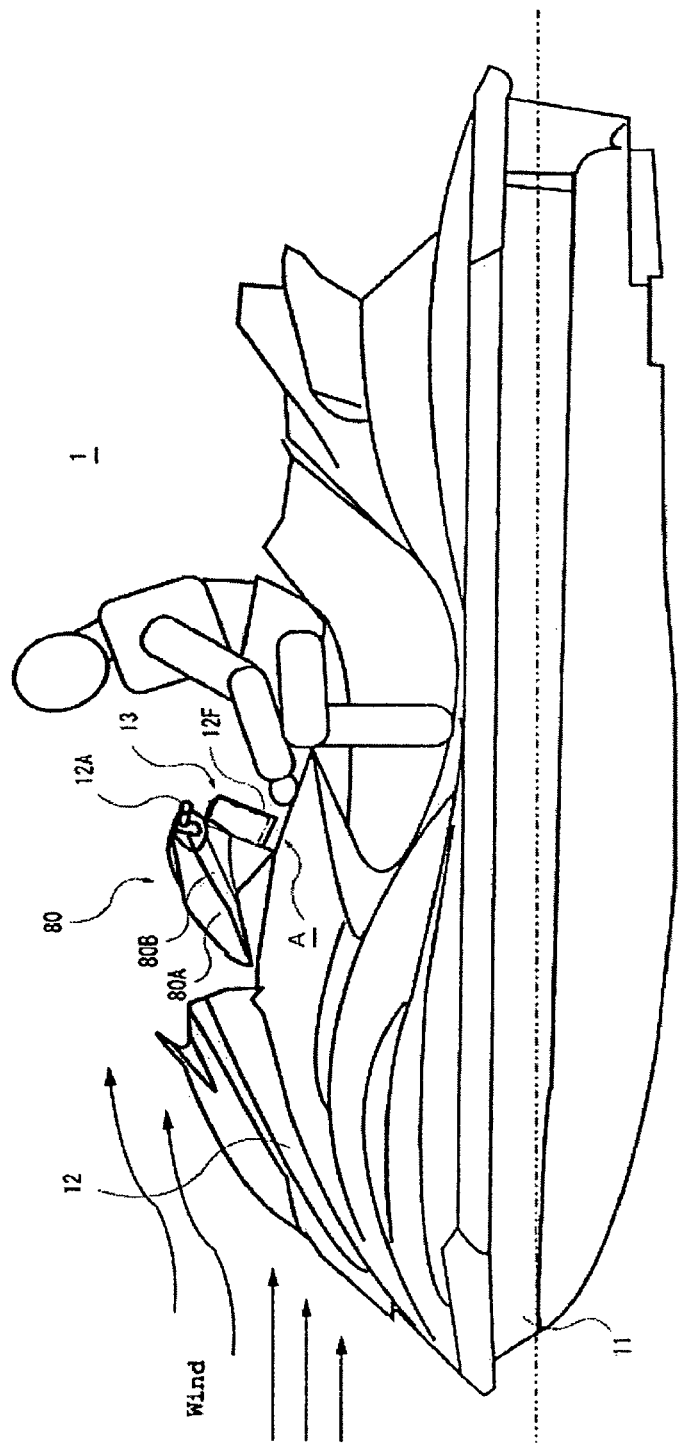
FIG. 30 is a side elevational view of the water jet propulsion boat, with a humanoid figure in the operator's area and showing a state in which the audio unit is supported by the steering section.

Further, since the audio unit 13 is close to the steering handlebars 12A, movement of the operator's hand for audio unit operation can be reduced. Further, as shown in FIG. 30, the audio unit 13 can be positioned in front of the operator, and the location of the audio unit 13 can be closer to the operator. Thus, displacement of the operator's eyes during operation of the boat can be smaller, so that the operator can operate the player 13C1 while visually checking the player. Further, the rear cover half 80B can be formed with the storage box 12F. Thus, simply replacing the existing rear cover half with the rear cover half 80B allows the audio unit to be disposed on the ready-made model of the water jet propulsion boat.

Figure 31:
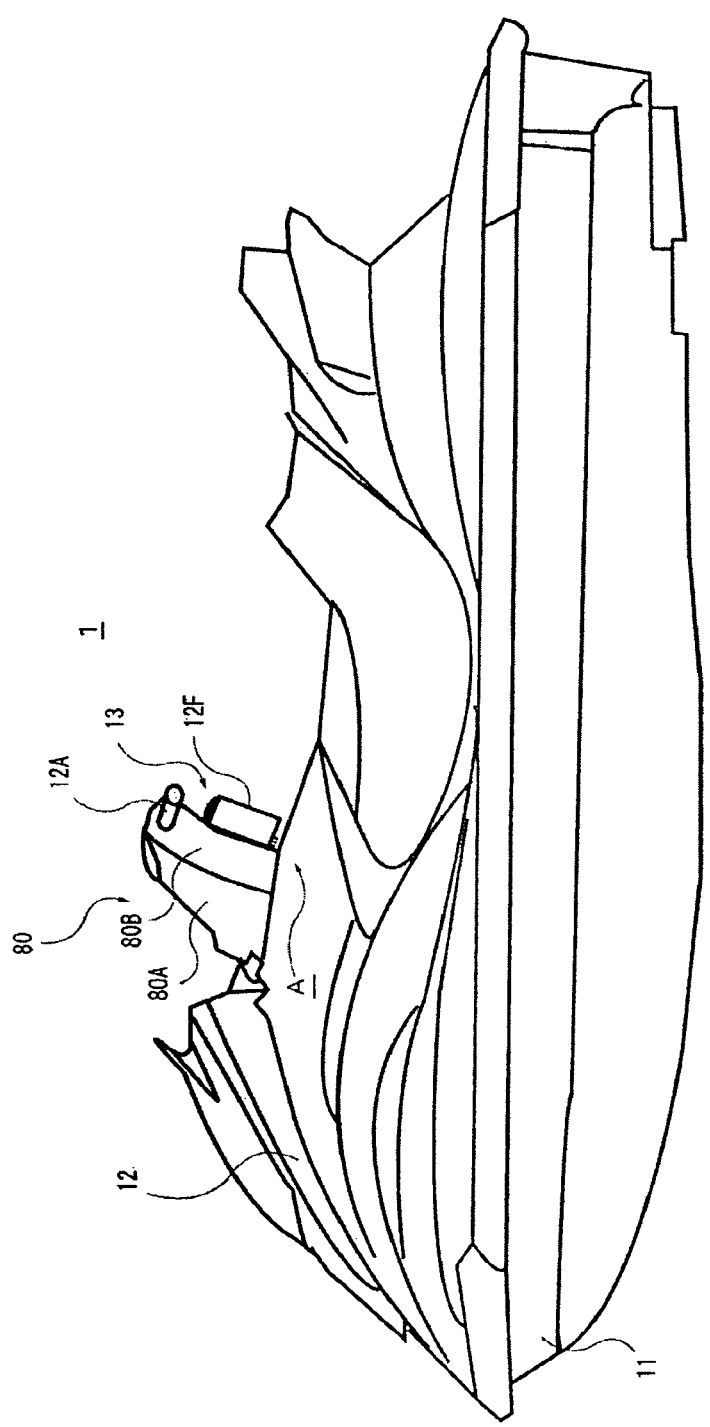
FIG. 31 is another side elevational view of the water jet propulsion boat with the steering section adjusted to a different position.
Figure 32:
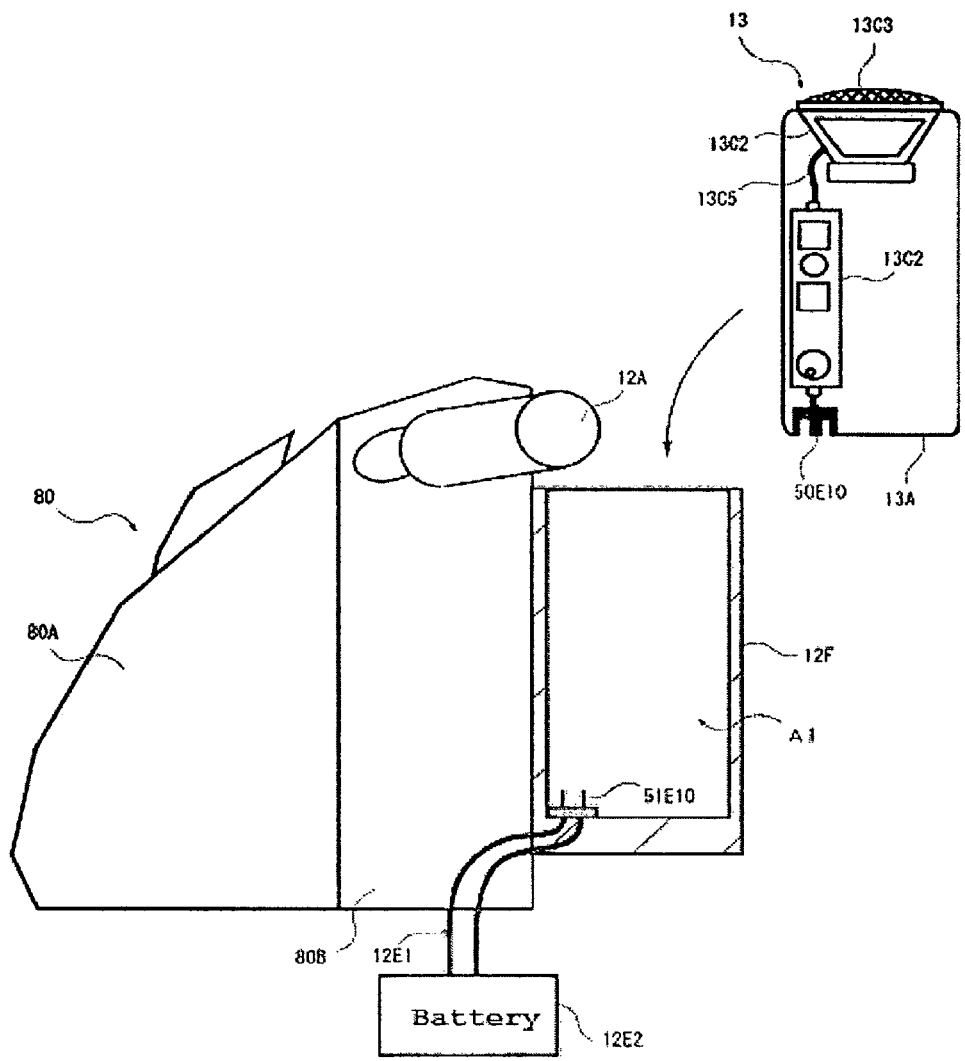
FIG. 32 is an enlarged side elevational view of the steering section in the position shown in FIG. 31, with the audio unit shown in an exploded and partially in section.
Figure 33:
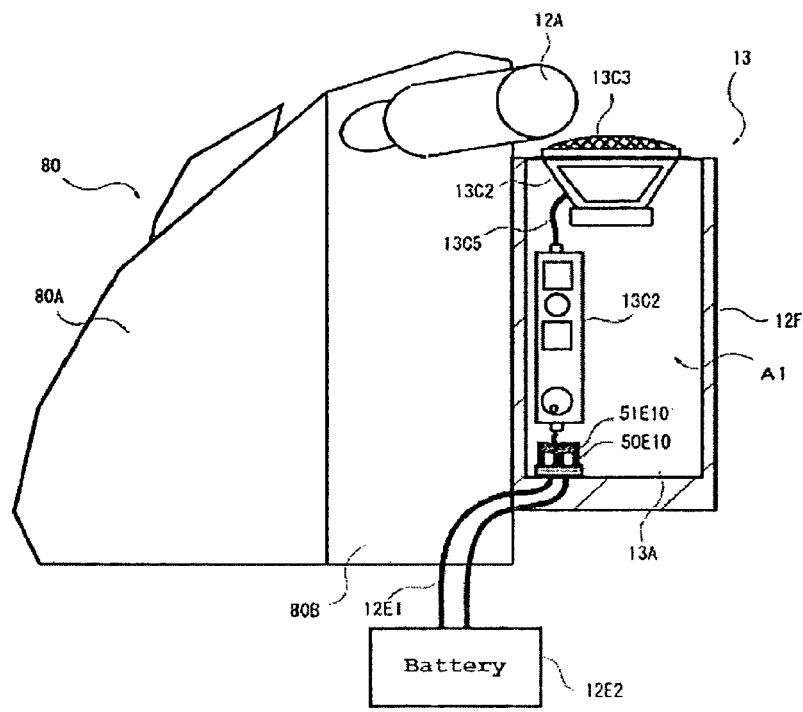
FIG. 33 is another side elevational and partial sectional view of the steering section with the audio unit.
Figure 34:
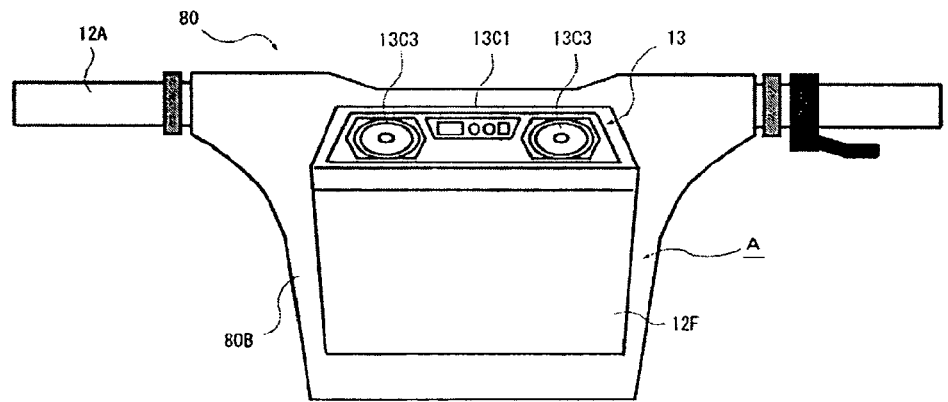
FIG. 34 is a rear elevational view of the Steering section, as seen from the operator's side, showing the state in which the audio unit is supported by the steering section.

Further optional modifications are illustrated FIGS. 31-36. As shown in FIG. 31, the water jet propulsion boat can include a body 1, and the steering section of the steering handlebars 12A can be covered with the steering cover 80. The steering cover 80 can have a two-piece structure and can be made up of the front cover half 80A and the rear cover half 80B, which are joined to each other to be mounted. The rear cover half 80B can be formed integrally with the storage box 12F, as shown in FIGS. 32 through 34.

A power supply connector 50E10 can be provided at a bottom part of the audio unit 13, and the power supply connector 50E10 can be connected to the amplifier 13C2. The storage box 12F can be provided with the power supply connector 51E10, which can be connected to the battery 12E2, mounted on the body 1, via the power supply cable 12E1.

The audio unit 13 can be received in the storage box 12F of the rear cover half 80B. The power supply connector 50E10 of the audio unit 13 and the power supply connector 51E10 of the storage box 12F are connected to each other. The audio device 13C of the audio unit 13 thus becomes ready for use. Alternatively, there may be provided a rechargeable battery pack to supply power to the audio unit 13.

In such manner, as the storage box 12F can be provided at the rear part of the steering handlebars 12A, the audio unit 13 mounted in the storage box 12F can be positioned at the rear part of the steering handlebars 12A, so that the audio unit 13 is not easily sprayed with water. Further, the audio unit 13 can output sounds, from the speakers 13C3 on the top outer face of the casing, which is not affected by the wind from a forward direction.

Further, since the audio unit 13 can be close to the steering handlebars 12A as shown in FIG. 34, displacement of the rider's hand for audio unit operation can be reduced. Further, the audio unit 13 can be positioned in front of the operator, and the location of the audio unit 13 can be closer to the operator. Thus, displacement of the operator's eyes during operation of the boat can be smaller, so that the operator can operate the player 13C1 while visually checking the player.

Figure 35:
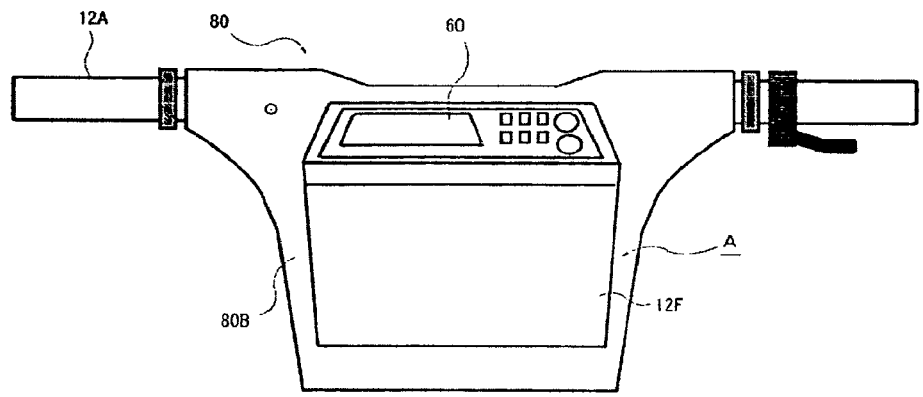
FIG. 35 is a perspective view, as seen from the operator side, of the steering section, showing the state in which the GPS unit is disposed.

Further, as with some of the above described embodiments, it is possible for the rider to use the water jet propulsion boat according to his/her intended purpose such as touring, by removing and replacing the audio unit with the GPS unit 60, as shown in FIG. 35.

Figure 36:
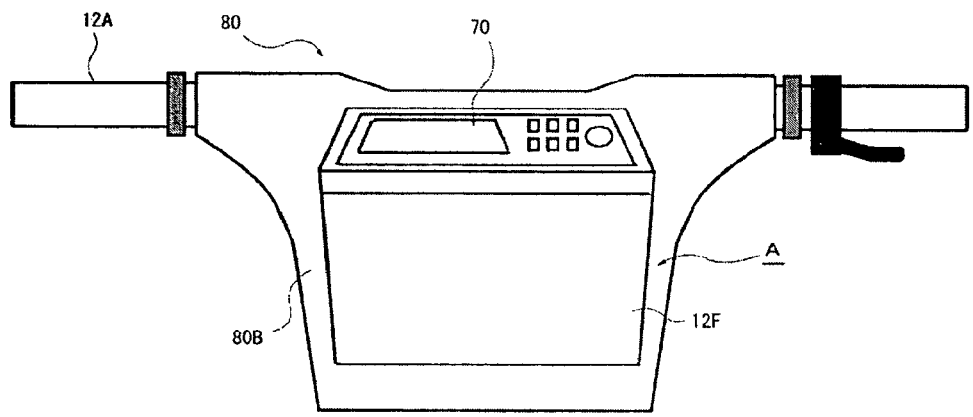
FIG. 36 is a perspective view, as seen from the operator side, of the steering section, showing the state in which the fish-finding unit is disposed.

Further, as with Embodiment 10, it is possible for the rider to use the water jet propulsion boat according to his/her intended purpose such as fishing, by removing and replacing the audio unit with the fish-finding unit 70, as shown in FIG. 36.

The present inventions are applicable to a water jet propulsion boat having a water jet propulsion device to propel the boat. The present inventions can be adapted to a large diversity of uses. Also, the present inventions enable the use of various devices including an audio device.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A water jet propulsion boat comprising:
a hull, a seat, and steering handlebars;
a water jet propulsion device disposed in the hull and configured to propel the boat;
a storage box defined by a recess in the hull, the recess opening upwardly to an exterior of the boat and arranged between the seat and the steering handlebars;
an electric unit accommodated in the storage box; and
a lid covering the storage box wherein
the storage box includes a hole arranged to communicate an interior of the storage box to an exterior of the storage box;
the lid or the electric unit accommodated in the storage box can be removed from the water jet propulsion boat without using any tools; and
a cable is arranged to pass thorough the hole, and the cable extends to the steering handlebars.

2. The water jet propulsion boat according to claim 1, wherein the storage box is arranged to hold baggage and small articles.

3. The water jet propulsion boat according to claim 1, wherein the storage box is arranged at a rear part of the steering handlebars.

4. The water jet propulsion boat according to claim 1, wherein the cable is connected to an electric unit accommodated in the storage box.

5. The water jet propulsion boat according to claim 1, wherein the hole is arranged in a bottom wall of the storage box.

6. The water jet propulsion boat according to claim 1, wherein the hole is arranged in a side wall of the storage box.

7. The water jet propulsion boat according to claim 1, wherein the storage box includes a power supply connector.

8. The water jet propulsion boat according to claim 7, wherein the power supply connector is connected to a battery pack mounted in the hull.

9. The water jet propulsion boat according to claim 7, wherein the electric unit is connected to the power supply connector.

10. The water jet propulsion boat according to claim 1, wherein the lid does not include any electric units on an outer surface thereof.

* * * * *